(12) United States Patent
Benisch et al.

(10) Patent No.: US 10,696,306 B1
(45) Date of Patent: Jun. 30, 2020

(54) EVALUATING DRIVING CONTROL SYSTEMS FOR ELEGANT DRIVING

(71) Applicant: Lyft, Inc., San Francisco, CA (US)

(72) Inventors: Michael Jared Benisch, Menlo Park, CA (US); Emilie Jeanne Anne Danna, Sunnyvale, CA (US); Sameer Qureshi, Sunnyvale, CA (US)

(73) Assignee: Lyft Inc., San Francisco, CA (US)

( * ) Notice: Subject to any disclaimer, the term of this patent is extended or adjusted under 35 U.S.C. 154(b) by 0 days.

(21) Appl. No.: 16/583,109

(22) Filed: Sep. 25, 2019

(51) Int. Cl.
*B60W 40/09* (2012.01)
*B60W 40/10* (2012.01)
*G06Q 10/06* (2012.01)

(52) U.S. Cl.
CPC ............ *B60W 40/09* (2013.01); *B60W 40/10* (2013.01); *G06Q 10/0639* (2013.01)

(58) Field of Classification Search
CPC .............................. B60W 40/09; B60W 40/10
USPC ........................................................... 701/1
See application file for complete search history.

(56) References Cited

U.S. PATENT DOCUMENTS

| | | | |
|---|---|---|---|
| 2014/0309891 A1* | 10/2014 | Ricci | B60R 25/20 701/48 |
| 2017/0166222 A1* | 6/2017 | James | B60W 50/14 |
| 2017/0174221 A1* | 6/2017 | Vaughn | G05D 1/0221 |
| 2019/0308619 A1* | 10/2019 | Rosenbaum | B60W 30/0953 |

* cited by examiner

*Primary Examiner* — Thomas G Black
*Assistant Examiner* — Luat T Huynh
(74) *Attorney, Agent, or Firm* — Baker Botts L.L.P.

(57) ABSTRACT

In one embodiment, a method includes accessing a first set of driving metrics of a vehicle navigating a segment using a driving control system; computing, based on the first set of driving metrics, a driving characteristic for the vehicle. The driving characteristic of the vehicle being represented by the first set of driving metrics. The method also includes comparing the driving characteristic of the vehicle to a driving characteristic of a number of manually controlled vehicles represented by a second set of driving metrics collected while navigating the segment; and computing a score indicating an elegance of the driving control system in navigating the segment based on the comparison of the driving characteristic of the vehicle to the driving characteristic of the number of manually controlled vehicles.

20 Claims, 14 Drawing Sheets

EVALUATING DRIVING CONTROL SYSTEMS FOR ELEGANT DRIVING

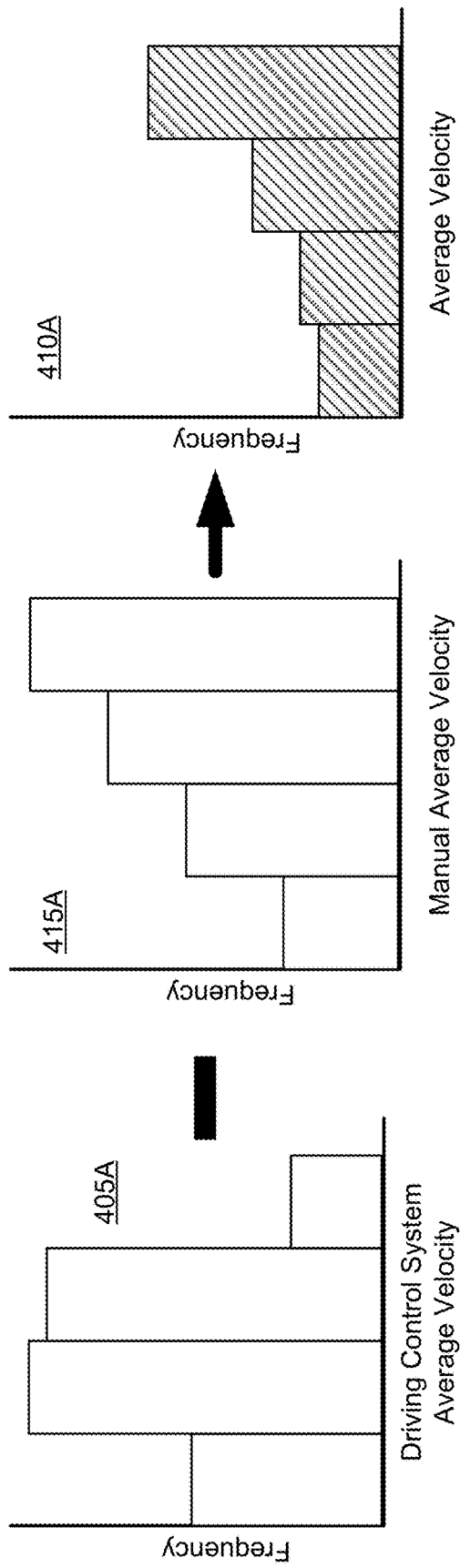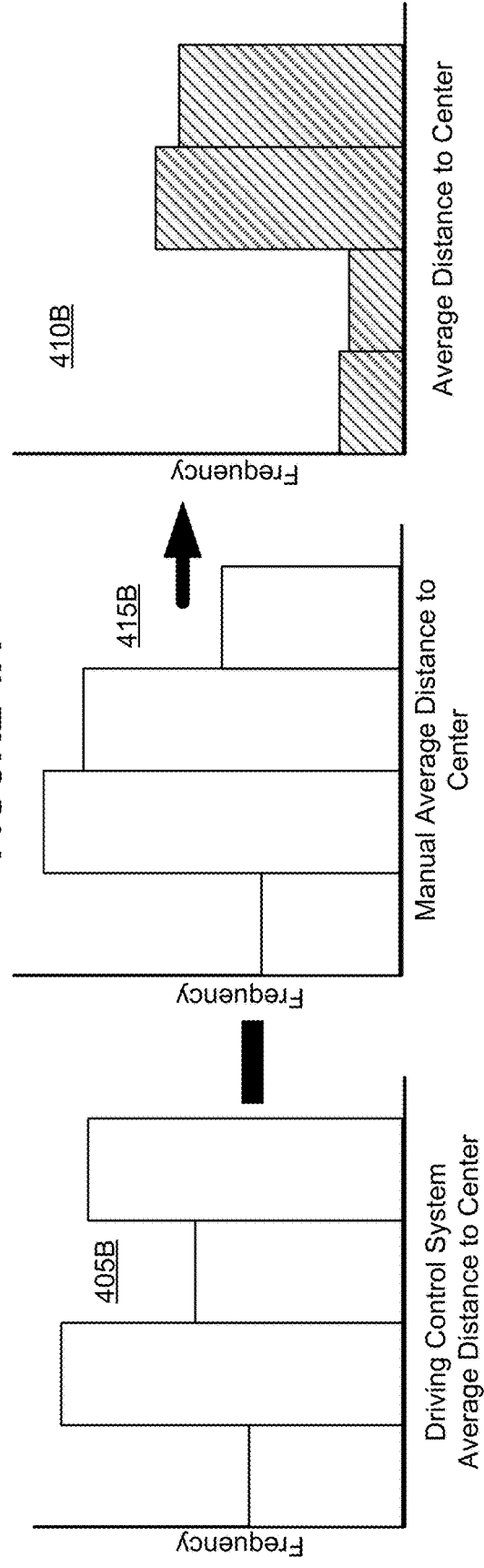
FIGURE 4A
FIGURE 4B
EVALUATING DRIVING CONTROL SYSTEMS FOR ELEGANT DRIVING

EVALUATING DRIVING CONTROL SYSTEMS FOR ELEGANT DRIVING

EVALUATING DRIVING CONTROL SYSTEMS FOR ELEGANT DRIVING

EVALUATING DRIVING CONTROL SYSTEMS FOR ELEGANT DRIVING

EVALUATING DRIVING CONTROL SYSTEMS FOR ELEGANT DRIVING

EVALUATING DRIVING CONTROL SYSTEMS FOR ELEGANT DRIVING

EVALUATING DRIVING CONTROL SYSTEMS FOR ELEGANT DRIVING

EVALUATING DRIVING CONTROL SYSTEMS FOR ELEGANT DRIVING

BACKGROUND

Different levels of driving by vehicles with a driving control system are becoming increasingly commonplace. Driving control systems include several hardware and software modules to perform different aspects of driving a vehicle. Successful driving using a driving control system involves a multitude of potential vehicle actions and while a particular driving control system may get a person to their destination, the quality of the ride may be neither comfortable nor elegant. The concept of elegance may be considered the achievement of "human-like" driving experience. For example, a ride in a vehicle may be considered comfortable, but not elegant. As an example and not by way of limitation, a vehicle, when taking a turn, it may be comfortable to take the turn at 10 miles per hour, but it may be elegant to take the same turn at 25 miles per hour. These considerations may affect whether the driving control system directs the vehicle to accelerate, maintain speed, or decelerate while navigating a particular section of a route. The hardware and software modules lead to different types of driving characteristics. Based on changes in these driving characteristics, new versions of the driving control system may be updated and tested periodically evaluated.

Based in part on these considerations, different versions of driving control systems may be tested, but there is a lack a statistical method for evaluating driving performance, identifying areas of improvement for the driving control system, and adjusting driving control systems.

BRIEF DESCRIPTION OF THE DRAWINGS

FIGS. 4A-4C illustrate example comparisons of distributions of driving metrics.

DESCRIPTION OF EXAMPLE EMBODIMENTS

Figure 1:
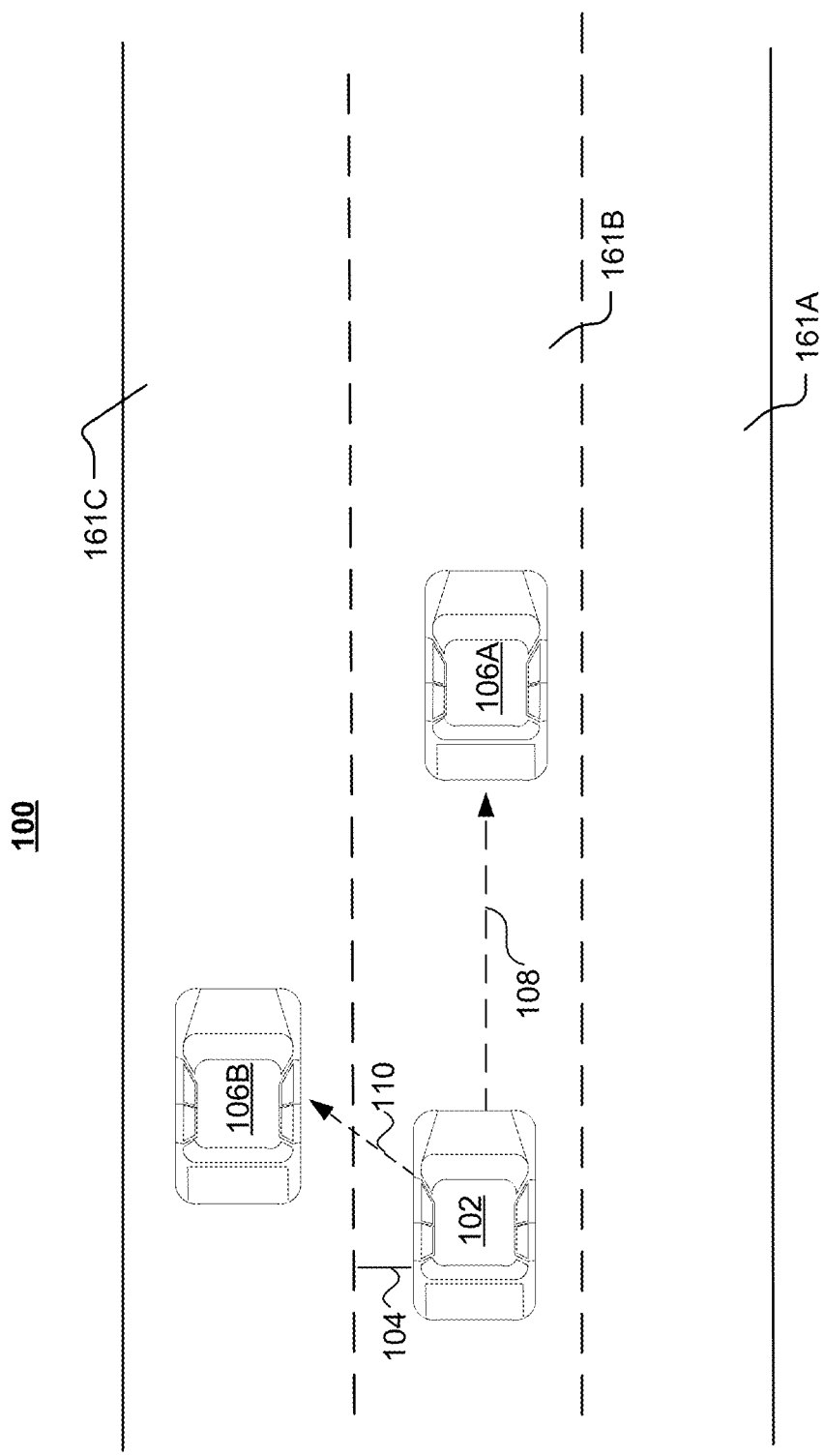
FIG. 1 illustrates an example vehicle navigating a route.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Subject matter described herein is generally directed to measuring an elegance of a particular version of a driving control system by indicating how similar to human driving the performance of the driving control system is or may be used during the real-time operation to improve passenger comfort. In particular embodiments, adjustments to the driving control system may be made that are based on the identified areas of improvement. in addition, the model may be used to determine one or more adjustments to a particular version of the driving control system based on a comparison of the driving characteristics of the vehicles having a driving control system to desired driving characteristics, as described in more detail below. In particular embodiments, the driving characteristics of manually controlled (e.g., having a human driver) vehicles may be used as a desired driving characteristic. Designing a driving control system that is able to mimic the driving characteristics of a human driver is particularly challenging. Herein reference to vehicles using driving control systems or autonomous control systems may encompass vehicles equipped with fully autonomous systems, advanced driver-assistance systems (ADAS), or other semi-autonomous computing systems that include one or more elements of perception, prediction, and path planning functionality, where appropriate. An autonomous control system may include software elements (e.g., perception, prediction, autonomy, planning, and control software modules), hardware elements (e.g., computing systems hosting the software modules, sensors, communication network infrastructure, actuator controllers, etc.), and mapping information that is necessary for the operation of the driving control system. Different "versions" of a driving control system may mean that one or more software, hardware, or knowledge aspects of an autonomous or semi-autonomous control system may be different than another driving control system. For example, a different prediction algorithm or planning algorithm/model may be implemented in a particular autonomy system while the hardware modules and other software modules remain the same as a previous version. Similarly, one or more aspects of the hardware system may be updated or changed while an autonomy stack (perception, prediction, planning, and control modules) making driving decisions for the vehicle remains the same. Many different versions of the driving control systems may be developed and tested in order to develop the best possible autonomous control system for a vehicle. Furthermore, reference to a software module may refer to algorithms, such as for example, machine-learning (ML), artificial intelligence (AI), deep learning, heuristics, logic, or any suitable set of instructions, where appropriate.

While these driving metrics are important considerations for successful navigation, these factors may be difficult to quantify and use to evaluate the performance of one version of a driving control system to another. Embodiments below describe using a pre-determined distribution of data to statistically evaluate the performance of a driving control system. Herein reference to driving metrics may encompass values of data that is measured by the sensors (e.g., acceleration, deceleration, or steering angle) or derived from the data measured by the sensors (e.g., distance to objects (or road features) or jerk (acceleration per second)), where appropriate. Furthermore, reference to a driving characteristic may refer to a characteristic represented by the driving metrics, where appropriate. As an example and not by way of limitation, a driving characteristic may include acceleration, deceleration, distance from a center of a driving lane, distance from nearby objects, amount of centripetal force, steering angle, change of acceleration, or average speed over a route. As described below, the data may be measured using a variety of sensors (e.g., inertial measurement unit (IMU), radar, camera (optical or infrared), or accelerometer).

In particular embodiments, driving metrics collected from the sensors of a fleet of manually controlled vehicles may be used to understand elegant driving behavior. The driving metrics of vehicles having a driving control system may be benchmarked and compared to driving metrics of the manually controlled vehicles to benchmark and compare driving algorithms to determine the elegance of different driving algorithms. The evaluation and benchmarking may be made across a fleet of vehicles as opposed to individual vehicles with unique driving metrics specific only to that vehicle. As described in more detail below, the driving metrics may be assigned to particular ranges and a distribution of the driving metrics may be generated. In particular embodiments, for each of these driving characteristics, the driving metrics representing the driving characteristics of the vehicles having a driving control system may be compared to the driving metrics representing a desired driving characteristic. A goal may be to minimize the difference the driving metrics representing the driving characteristics of the vehicles having a driving control system and the driving metrics representing desired driving characteristics. The desired driving characteristics may be one or more of driving characteristics of a human driver and a goal may be for the driving control system to achieve "human-like" driving metrics for one or more driving characteristics or elegance. Herein reference to elegance may encompass the concept of matching driving metrics of a driving control system to the driving metrics of a human driver, where appropriate.

FIG. 1 illustrates an example vehicle navigating a route. As illustrated in the example of FIG. 1, a particular scenario 100 may include a number of vehicles 102 and 106A-106B navigating a portion of a route that includes lanes 161A-161C. Herein reference to a scenario encompasses a combination of dynamic, static, and environmental information that a vehicle may come in contact with in the world. For example, a particular scenario may represent a type of road segment (e.g., one way, residential road, highway, etc.) or intersection (e.g., 4 way, 3 way, etc.), types of relevant dynamic agents present on the road segment (e.g., a jaywalker, pedestrians, vehicle within 15 yards, bicyclist, etc.), and types of static traffic elements present (e.g., upcoming stop sign, stoplight, etc.). In addition, scenario 100 may include environmental information, such as for example traffic conditions, weather, day of week, or time of day. Furthermore, reference to a route may encompass any number of different sections of a road or highway between two geographic locations (also referred to as "road segments"). These road segments may divide a drivable surface in any suitable manner and may be defined in a number of different ways. For example, road segments may be the same length (e.g., ⅓ mile), different lengths (e.g., based on different types of intersections or traffic elements within that road segment), based on performance along the drivable surface (e.g., a continuous drivable surface having similar traffic elements, presence of similar dynamic agents, and/or performance by manual and/or autonomous/semi-autonomous driving control system), etc.. Vehicle 102 navigating a route may include one or more sensors. Vehicle 102 may navigate various routes and while navigating the routes collect sensor data, as described in more detail below. Vehicle 102 navigating the routes may be manually controlled or controlled through a driving control system (e.g. having some level of assisted navigation). Different paths may be more or less elegant based on the choices of the planning module and, as described in more detail below, different driving characteristics play a role in elegance or comfort of the ride when navigating these different paths.

As an example and not by way of limitation, in scenario 100, vehicle 102 having a driving control system may navigate a route while in lane 161B of the highway. Lane 161B may also include vehicle 106A and lane 161C may include vehicle 106B. Vehicle 102 may use the systems and methods as described in this disclosure to observe vehicles 106A-106B and navigate the route based on the observation of vehicles 106A-106B and any other relevant objects on the route. While navigating a route, the sensors of vehicle 102 having the driving control system may collect data of the driving characteristics of one or more driving metrics. As an example and not by way of limitation, optical cameras of vehicle 102 may be used to determine a distance 104 of vehicle 102 to the lane markers on either side of vehicle 102. As another example, the radar of vehicle 102 may be used to determine a distance 108 between vehicle 102 and vehicle 106A, while the LiDAR of vehicle 102 may be used to determine a distance 110 to vehicle 106B. The driving metrics of other driving characteristics, such as for example velocity, acceleration, braking force, or the distance from the center of lane 161B, may be measured and recorded while navigating the route. As an example and not by way of limitation, an accelerometer may measure the amount of deceleration occurs in response to a rapid decrease in distance 108 between vehicle 102 having the driving control system and vehicle 106A.

A driving control system or human driver has to perceive the external environment and make numerous decisions based on the perceived environment. There are many ways for a route to be successfully navigated by a driving control system, but in a particular embodiment, a goal of the driving control system may be to achieve elegance and match the driving characteristics of a manually driven vehicle as closely as possible, as described in more detail below. As an example and not by way of limitation, based on the observation of vehicle 106A, the driving control system of vehicle 102 may adjust its velocity to match the value of distance 108 for a manually controlled vehicle navigating the route. As another example, the driving control system of vehicle 102 may adjust its steerage to the maintain a certain distance 104 between vehicle 102 and an edge of lane 161B.

Figure 2:
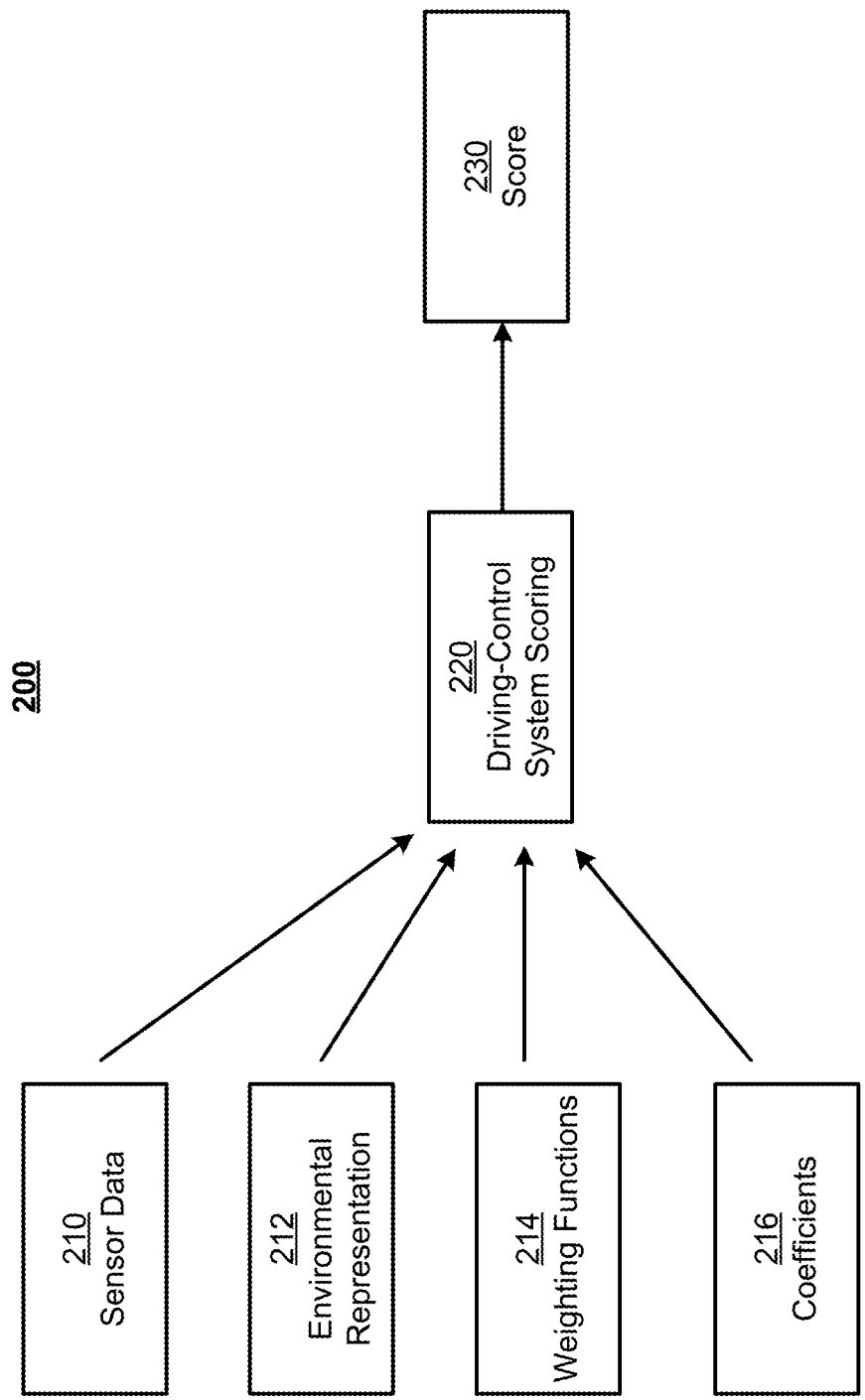
FIG. 2 an example network architecture for evaluating driving control systems.

FIG. 2 illustrates an example network architecture for evaluating driving control systems. In particular embodiments, a driving-control system scoring 220 may receive a variety of input data associated with one or more driving control systems. The input data may be stored in any suitable fashion such that it is accessible to driving-control system scoring 220 as needed. In particular embodiments, the input data may be stored as a number of records that include input data organized based around the route being navigated. The input data may also be organized based around the particular scenario encountered, information regarding a passenger of the vehicle, or any other suitable variable. The particular scenario is a combination of dynamic, static, and environmental information that a vehicle may encounter while navigating a route.

Driving-control system scoring 220 may receive an environmental representation 212 of the environment around a respective vehicle. The environmental representation 212 may include information about the environment around the vehicle from before, during, or after the vehicle navigates a route. In particular embodiments, environmental representation 212 may include a standardized format to represent, for example, the presence of other vehicles, persons, or objects (referred to as the objects in the environment, for simplicity) around the vehicle. Objects may include other vehicles, pedestrians, or road obstacles, and road features may include intersections, drop-offs, center of lane, or lane markings. Environmental representation 212 may include a predicted path of the detected objects in the environment. Also, in the case where the objects have a special meaning, the state of the objects may be noted. For example, a parked car may be noted as being different from a vehicle traveling in the same direction as the vehicle. As another example, a status of a traffic light (e.g., green, yellow, red, solid, flashing, off) may be noted and used when predicting the behavior of the identified objects/agents.

In addition to the environmental representation 212, driving-control system scoring 220 may receive vehicle operation data 210 from one or more sensors of the vehicle having a driving control system. Vehicle operation data 210 may include information related to the vehicle operation measured during or recorded after the vehicle navigates a route. One or more sensors associated with the vehicle may provide data about the operation of the vehicle at any given time. The sensors may include one or more sensors that measure a vehicle's speed, throttle position, brake position, steering angle, tire pressure, fuel or charge level (e.g., level of gasoline, diesel, battery), acceleration, jerk, or any combination thereof. The sensors may include one or more sensors that output information about the external environment of the vehicle. This may include one or more sensors for measuring temperature, humidity, visibility, road condition, traction, distance to objects (e.g., other vehicles, pedestrians, edges of the road, or other objects). Driving metrics are the values of the driving characteristics measured by these sensors.

In particular embodiments, driving-control system scoring 220 may determine a distribution of the driving metrics representing a particular driving characteristic. As an example and not by way of limitation, driving-control system scoring 220 may determine a range for a driving characteristic corresponding to a distance of the vehicle to other vehicles, the driving metrics may range between 8 to 24 inches based on information provided by environmental representation 212. Based on this range, vehicle-control system scoring 220 may determine a number of intervals to represent the distribution of the value of the driving metrics and assign each value of the driving metric to a corresponding interval.

In particular embodiments, driving-control system scoring 220 may receive one or more weighting functions 214 to be applied to the driving metrics representing one or more driving characteristics. Weighting functions 214 serve as a filter that may amplify some portions of the driving characteristics and minimizes other portions of the driving characteristics based on the desirable or undesirable operational action, ranges, and information being evaluated. As an example and not by way of limitation, lower values of deceleration may be weighed more heavily than higher values of deceleration. As another example and not by way of limitation, lower values of deceleration may be weighed more heavily than higher values of deceleration. In particular embodiments, weighing functions 214 may be based on user evaluation of one or more driving metrics of a particular driving characteristic. As an example and by way of limitation, passengers of a vehicle may be afforded the opportunity to provide feedback about one or more driver metrics experienced while riding in a vehicle. The feedback may be directed to an entire route or to discrete segments of the route as described in more detail below. The evaluations from the users may be provided to driving-control system scoring 220 in the form of weighting functions 214. As an example and not by way of limitation, for the driving characteristic corresponding to deceleration on a particular route, low levels of deceleration may be weighed more heavily than high levels of braking force, as high levels of braking force may lead to suboptimal rapid deceleration that may be undesirable and uncomfortable for users. As another example, low levels of deceleration may be weighted more heavily than high levels of braking force, as high levels of braking force may lead to suboptimal rapid deceleration that may be undesirable for most users. In particular embodiments, one or more passengers may be provided the opportunity to evaluate different driving characteristics while riding in the vehicle.

Driving-control system scoring 220 may compare the driving characteristics of the vehicles having a driving control system to desired driving characteristics. As described in more detail below, driving-control system scoring 220 compares driving metrics of one or more particular driving characteristics to measured operational metrics associated with the driving control system. As an example and not by limitation, for a particular route or segment, the driving metrics corresponding to the distance to other vehicles by vehicles having a driving control system may be compared to the driving metrics of the desired distance to other vehicles on that route. As another example, the driving metrics corresponding to the velocity by vehicles having a driving control system may be compared to the driving metrics of the desired velocity on that route. In particular embodiments, the comparison may be based on comparing different values of the driving characteristics weighed using weighing functions 214.

In particular embodiments, driving-control system scoring 220 may receive one or more coefficients 216 to be applied to one or more driving characteristics to determine a score 230 for a particular driving control system for a particular route. The values of coefficients 216 may weigh particular driving characteristics to determine score 230. As an example and not by way of limitation, score 230 may be represented as a linear equation and calculated as a sum of the weighted product for each driving characteristic and its respective coefficient 216. Calculating score 230 for the route based on a sum of the weighted products. Score 230 may be used to statistically evaluate the performance of different versions (e.g., hardware modules or software modules) of the driving control system. In particular embodiments, score 230 for a route may be used to determine particular segments or scenarios (e.g., traffic or time of days) where a particular version of the driving control system may be underperforming by not providing an elegant driving experience while navigating the segment or in relation to those scenarios. An overall elegance score for a driving algorithm and/or system may be calculated based on the scores 230 for multiple routes or a complete route, a portion of a route, or any segment of driving activity.

Although this disclosure describes specific types of input data that may be used by driving-control system scoring 220, these are meant as examples only and are not limiting. Driving-algorithm scoring system 220 may consider any combination or variation of the data types described as well as any other suitable data that may be used by driving-control system scoring 220 for evaluating different versions of a driving control system. The input data, and possibly more as appropriate, may be used by driving-control system scoring 220 to generate one or more scores 230. In particular embodiments, driving-control system scoring 220 may be a subsystem operating directly on a vehicle. In particular embodiments, driving-control system scoring 220 may be a subsystem of a vehicle management system that is involved with the communication and/or control of the vehicle. In particular embodiments, driving-control system scoring 220 may include subsystems of one or more vehicles and the vehicle management system working in concert to generate the appropriate scores 230 for the vehicle. In some embodiments, score 230 may be generated for each particular vehicle having a driving control system. In particular embodiments, score 230 may be generated based on a variety of similarities between one or more vehicles.

Figure 3:
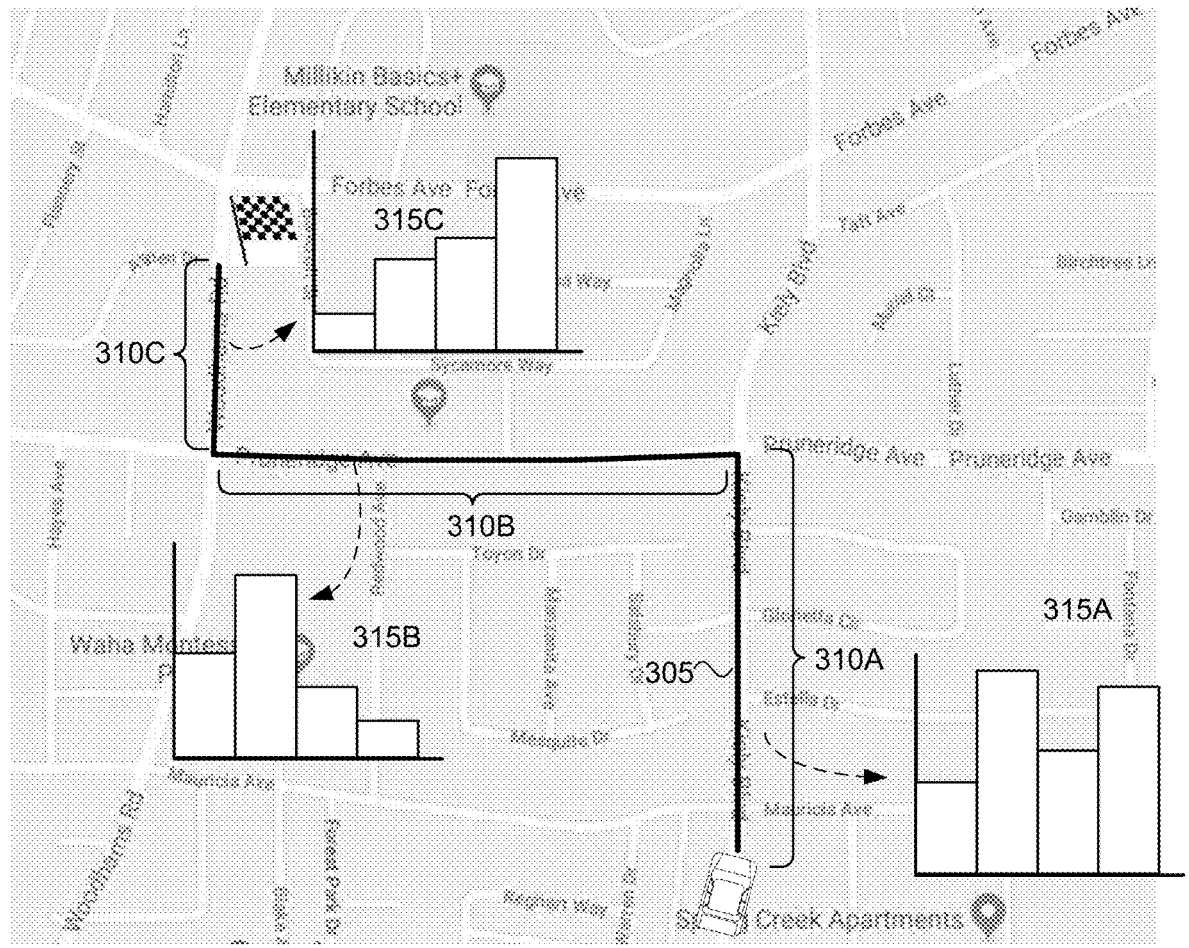
FIG. 3 illustrates an example partitioning of a route into a number of segments.

FIG. 3 illustrates an example partitioning of a route into a number of segments. In particular embodiments, a route 305 may be partitioned into a number of segments 310A-310C. As an example and not by way of limitation, route 305 may be partitioned into segments 310A-310C based on different road features along route 305 (e.g., each stop sign, stoplight, or intersection), pre-determined length (e.g., ¼ mile, 1 mile, etc.), driving time (e.g., 5-minute segments), or dividing route 305 into a predetermined number of equal-length portions (e.g., every 5 segments). As illustrated in the example of FIG. 3, each segment 310A-310C may have a different distribution 315A-315C of driving metrics depending on the scenario at the time the vehicle is navigating a particular segment 310A-310C (e.g., number of other vehicles, time of day, weather, or obstacles) or the features of the particular segment 310A-310C (e.g., number of turns, number of intersections, or number of traffic signals). As an example and not by way of limitation, vehicles navigating segment 310A may have a distribution 315A of the average distance from the center of the lane, while vehicles navigating segment 310B may have a distribution 315B of the average distance from the center of the lane. Vehicles navigating segment 310C may have a distribution 315C of the average distance from the center of the lane. As described in more detail below, distributions 315A-315C of driving metrics for each segment may be used to calculate a score for each segment or a score for the overall route based on a combination (e.g., summation or averaging) of the segment distributions 315A-315C.

As described in more detail above, the sensors of vehicles (having an autonomous or semi-autonomous control system, or manually controlled) collect the driving metrics of one or more driving characteristics while the vehicle is navigating route 305. In most cases, there may be differences between the driving metrics from manually controlled vehicles and vehicles having a driving control system navigating route 305. In addition, different versions of driving control systems (e.g. software or hardware modules), types of vehicles, sensor systems, etc. may have a different distribution of driving metrics and the different driving metrics may be tracked over time. In particular embodiments, a score calculated for each segment 310A-310C. As an example and not by way of limitation, the score for each segment 310A-310C may be summed to derive an overall score for route 305. As described below in more detail, a distribution of driving metrics may be determined for each segment 310A-310C and combined (e.g., summed or weighted) to determine a score for route 305.

Figure 4C:
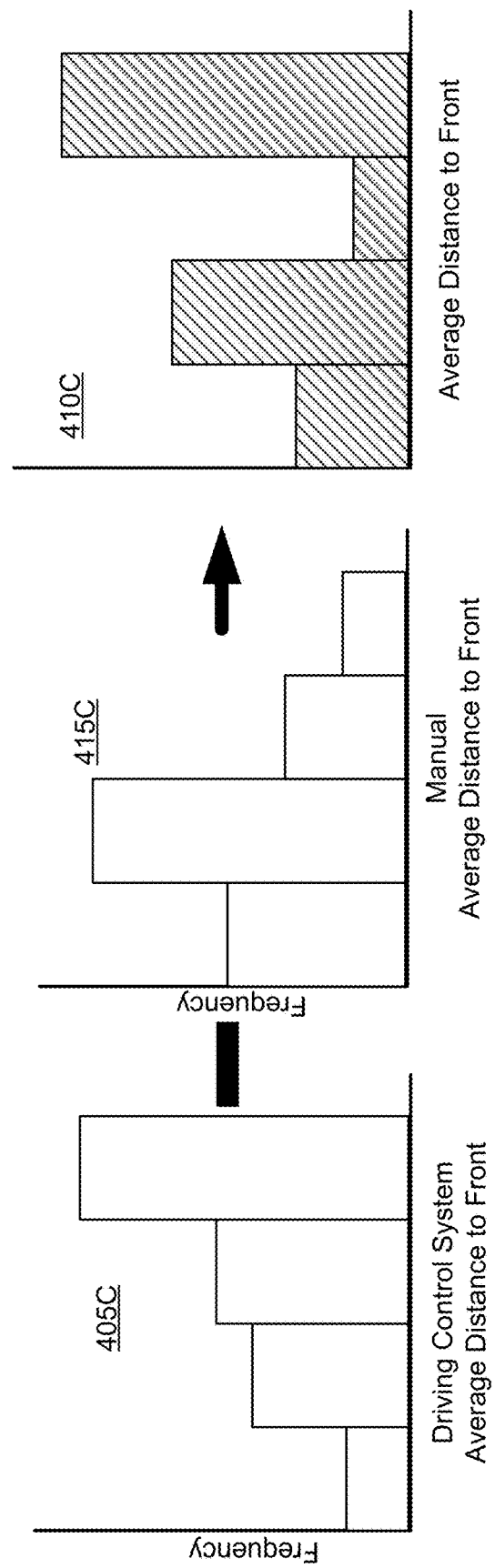

FIGS. 4A-4C illustrate example comparisons of distributions of driving metrics. As described in more detail above, driving metrics collected from the sensors of a fleet of vehicles (e.g., manually controlled, autonomous control system, semi-autonomous control system, or any combination thereof) may be used to understand elegant driving behavior. The driving metrics of vehicles having an autonomous or semi-autonomous driving control system may be compared to driving metrics of the manually controlled vehicles to benchmark and compare versions of the driving control system to determine the elegance of the different versions of the driving control system. In particular embodiments, the distribution of driving metrics of the desired driving characteristics may be based on sensor data measured by manually controlled vehicles navigating the route. As an example and not by way of limitation, the driving metrics for acceleration on a particular route may be determined from the acceleration data measured by the sensors of manually controlled vehicles navigating the particular route.

The driving metrics of manually controlled vehicles may be compared to the driving metrics of vehicles having a driving control system to benchmark and compare the elegance of driving control systems to human-driving performance. The evaluation of a driving control system used for a route may be based on a comparison of the driving metrics of the vehicles having a driving control system to a pre-determined distribution of driving metrics. As an example and not by way of limitation, the pre-determined distribution of the driving metrics may correspond to the driving metrics of desired driving characteristics. In particular embodiments, the driving metrics of each driving characteristic may be assigned to particular ranges and a histogram of the driving metrics 405A-405C may be generated for direct comparison of the driving metrics for different driving characteristics.

As illustrated in the example of FIG. 4A, histogram 405A may correspond to the average velocity of vehicles having a driving control system navigating a particular route, histogram 415A may correspond to the average velocity of manually controlled vehicles navigating a particular route. In particular embodiments, histogram 415A of driving metrics of the desired driving characteristic may be overlaid over histogram 405A of the driving metrics of vehicles having a driving control system and, for each range, a histogram 410A of the differences between the driving metrics of the vehicles having a driving control system and the driving metrics of the manually controlled vehicles may be computed for each driving characteristic (e.g., average velocity).

As illustrated in the example of FIG. 4B, histogram 405B may correspond to the average distance of vehicles having a driving control system from a center of the lane, histogram 415B may correspond to the average distance of manually controlled vehicles from a center of the lane, and histogram 410B may correspond to the differences in the average distance of vehicles having a driving control system and manually controlled vehicles from the center of the lane. In particular embodiments, histogram 415B of driving metrics of the desired driving characteristic may be overlaid over histogram 405B of the driving metrics of vehicles having a driving control system and, for each range, a histogram 410B of the differences between the average distance to the center of the lane for the vehicles having a driving control system and the average distance to the center of the lane of the manually controlled vehicles may be computed.

As illustrated in the example of FIG. 4C, histogram 405C may correspond to the distance of vehicles having a driving control system to the vehicle in front of it, histogram 415C may correspond to the distance of manually controlled vehicles to the vehicle in front of it, and histogram 410C may correspond to the differences in the distance of vehicles having a driving control system and manually controlled vehicles to the vehicle in front of it. In particular embodiments, histogram 415C of driving metrics of the manually controlled vehicles may be overlaid over histogram 405B of the driving metrics of vehicles having a driving control system and, for each range, a histogram 410C of the differences between the average distance to the vehicle in front of the vehicles having a driving control system and the average distance to the vehicle in front of the manually controlled vehicles may be computed.

Figure 5A:
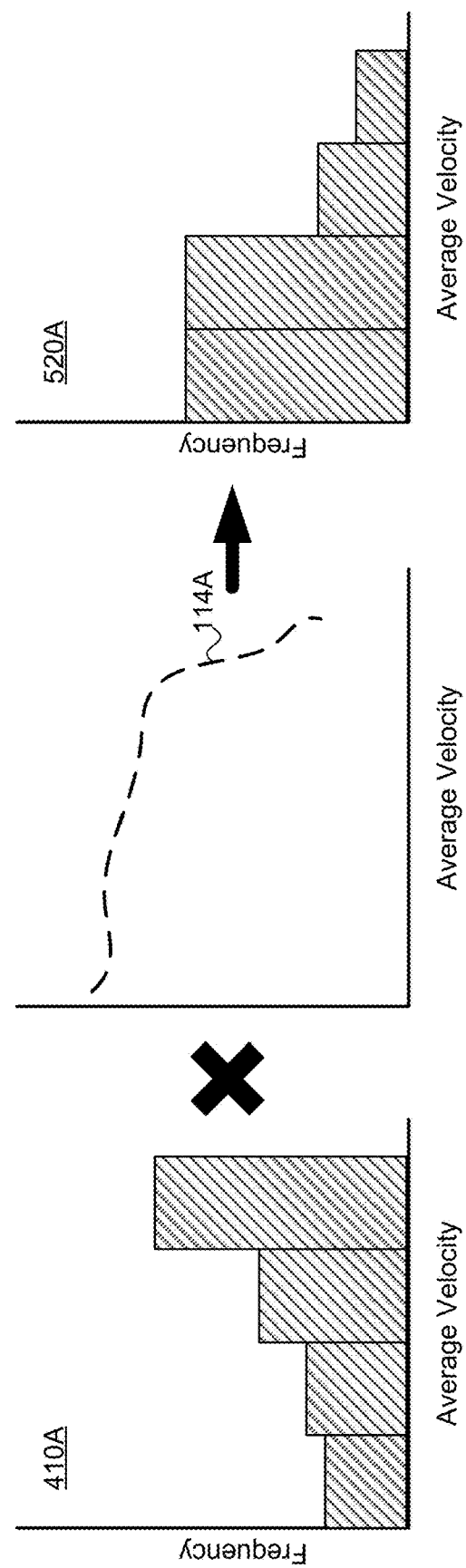
FIGS. 5A-5C illustrate example computations of weighted distributions of driving metrics.
Figure 5B:
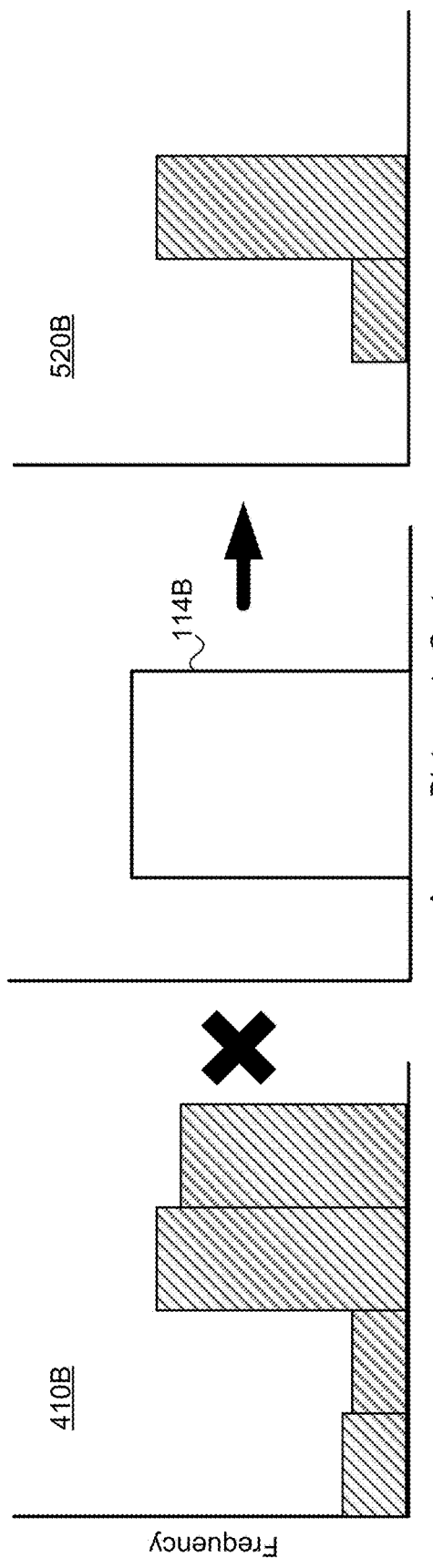
Figure 5C:
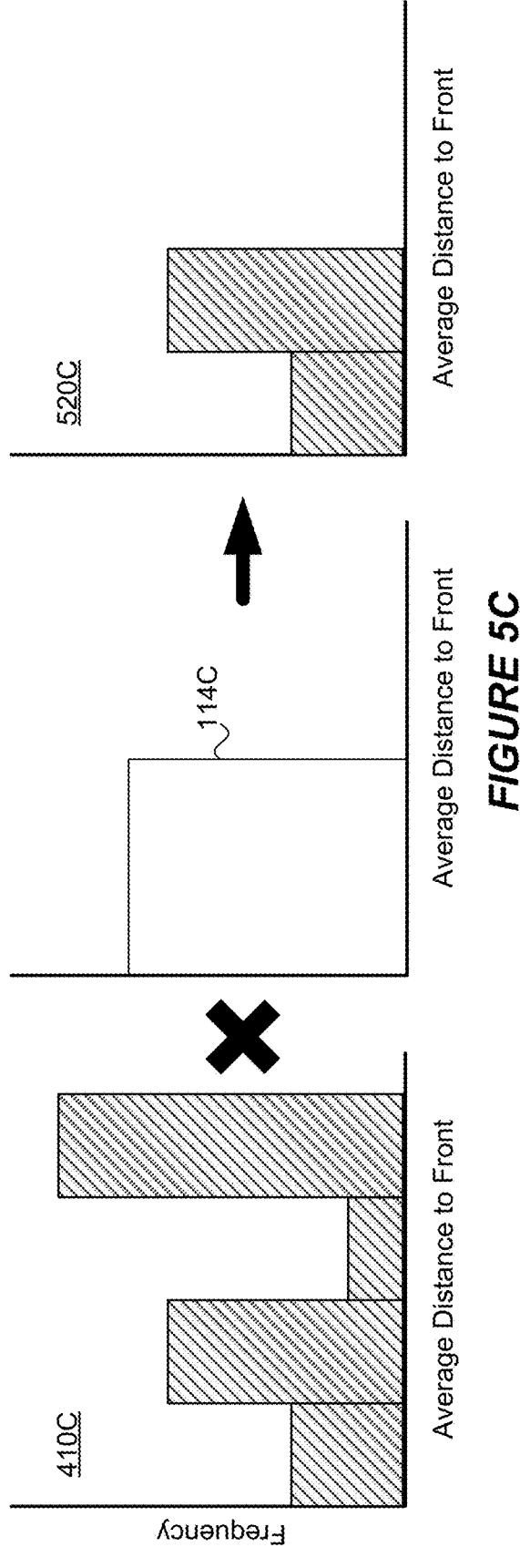

FIGS. 5A-5C illustrate example computations of weighted distributions of driving metrics. Analyzing the differences of the driving metrics 410A-410C may identify problematic issues with the algorithms of the planning module of a driving control system and identify particular maneuvers, road segments, and/or scenarios that are difficult for the driving control system to handle. Weighting functions 114A-114C may be asymmetric for particular driving characteristics. In particular embodiments, weighted differences 520A-520C may be used to determine the score of the segment or route. Weighting functions 114A-114C may be tailored to generate the score differently depending on the purpose or goal of the evaluation (e.g., elegance vs. a more comfortable ride). As an example and not by way of limitation, higher values of distance between a vehicle and a drop-off may be weighed more heavily (or be considered more desirable) than lower values of distance between the vehicle and an edge of a road (e.g., a sidewalk or a drop-off on the side of the road). In particular embodiments, passenger evaluations may be used as a basis for one or more weighting functions 114A-114C. In particular embodiments, a goal may be to minimize differences 410A-410C between the driving metrics representing the driving characteristics of the vehicles having a driving control system and the driving metrics representing desired driving characteristics. Although FIGS. 5A-5C describe and illustrate particular driving characteristics, this disclosure contemplates any suitable driving characteristics related to performance of a vehicle or relative to a map feature, such as for example, an amount of deceleration, acceleration, rate of acceleration, steering angle, angular momentum, velocity, distance to nearest object in path, distance to lane edge or boundary, distance from center of lane, distance into an intersection, or a perception the driving of the vehicle by other drivers (e.g., based on a frequency of car horn use by other vehicles).

As illustrated in the example of FIG. 5A, histogram 410A corresponding to the difference between the average velocity of the vehicles having a driving control system and the average velocity of the manually controlled vehicles may be weighed using weighting function 114A, thereby resulting in a histogram 420A of the weighted difference between the average velocity between of the vehicles having a driving control system and the manually controlled vehicles. In particular embodiments, weighting functions 114A-114C (e.g., step function) may be applied or convolved with histograms 410A-410C to determine a weighted differences 520A-520C of the segment or route.

As illustrated in the example of FIG. 5A, histogram 410A corresponding to the difference between the average velocity of the vehicles having a driving control system and the average velocity of the manually controlled vehicles may be weighed using weighting function 114A, thereby resulting in a histogram 520A of the weighted difference between the average velocity between of the vehicles having a driving control system and the manually controlled vehicles. In particular embodiments, weighting functions 114A-114C (e.g., step function) may be applied or convolved with histograms 410A-410C to determine a weighted differences 520A-520C of the segment or route. Similarly, as illustrated in the example of FIG. 5B, histogram 410B corresponding to the difference between the average distance to the center of the lane of vehicles having a driving control system and the average distance to the center of the lane of the manually controlled vehicles may be weighed using weighting function 114B, thereby resulting in a histogram 520B of the weighted difference between the average distance to the center of the lane of the vehicles having a driving control system and the manually controlled vehicles. As another example illustrated in FIG. 5C, histogram 410C corresponding to the difference between the average distance to the vehicles in front of vehicles having a driving control system and the average distance to the vehicles in front of the manually controlled vehicles may be weighed using weighting function 114C, thereby resulting in a histogram 520C of the weighted difference between the average distance to the vehicles in front of the vehicles having a driving control system and vehicles in front of the manually controlled vehicles.

Figure 6:
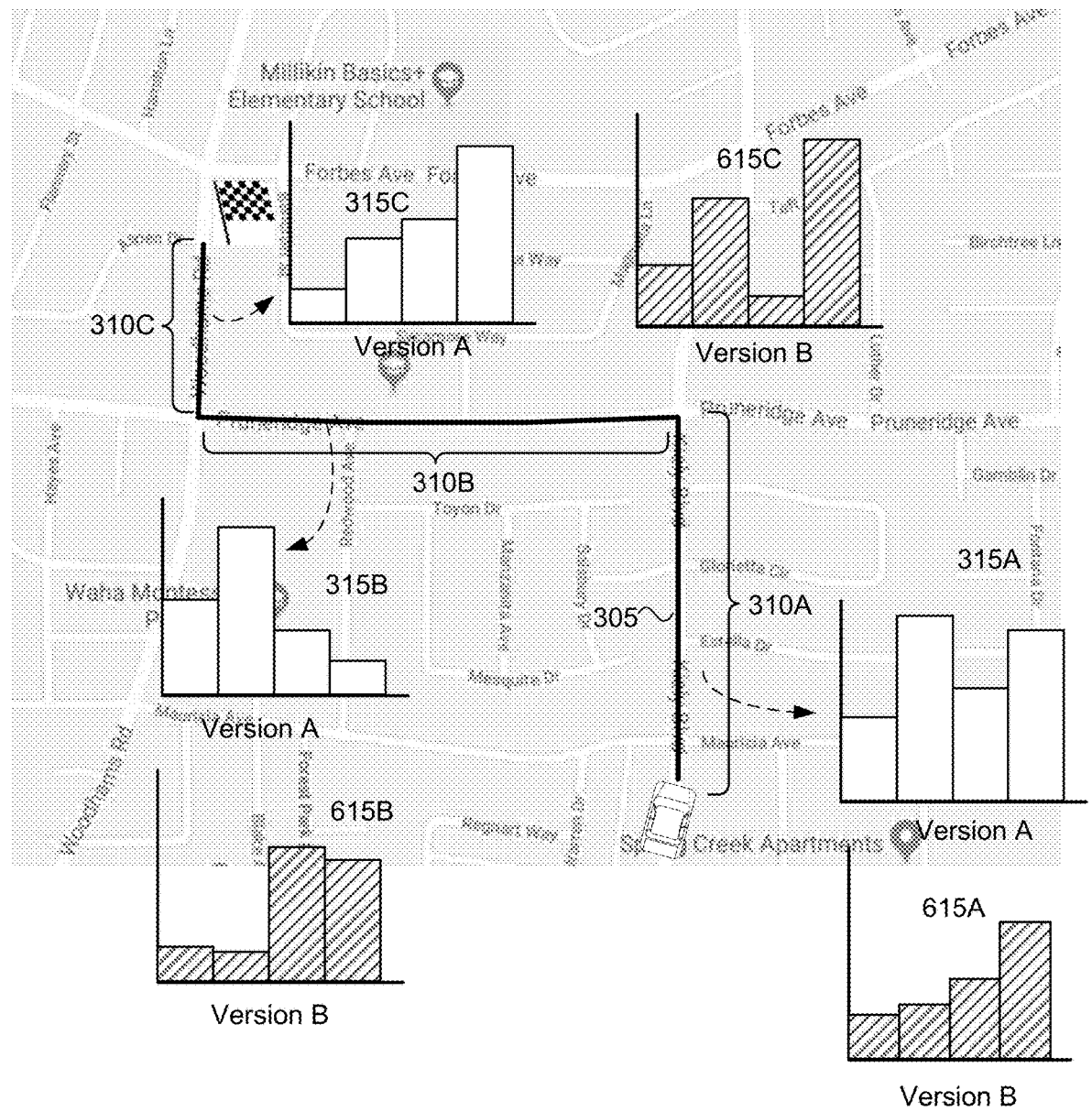
FIG. 6 illustrates example distributions of driving metrics between different versions of a driving control system.

FIGS. 6 illustrate example distributions of driving metrics between different versions of a driving control system. In particular embodiments, different versions of a driving control system may be compared based on the distributions of driving metrics of a vehicle navigating a route 305. As illustrated in the example of FIG. 6, a particular version (e.g., "version A") of the driving control system may have particular distributions 315A-315C of driving metrics for each segment 310A-310C of route 305. Furthermore, another version (e.g., "version B") of the control system may have different distributions 615A-615C of driving metrics for each segment 310A-310C of route 305. In particular embodiments, histograms 315A-315C of driving metrics of the "version A" of the driving control system may be overlaid over the corresponding histograms 615A-615C of the "version B" of the driving control system, so that the driving metrics of the respective versions of the driving control system may be compared.

Figure 7:
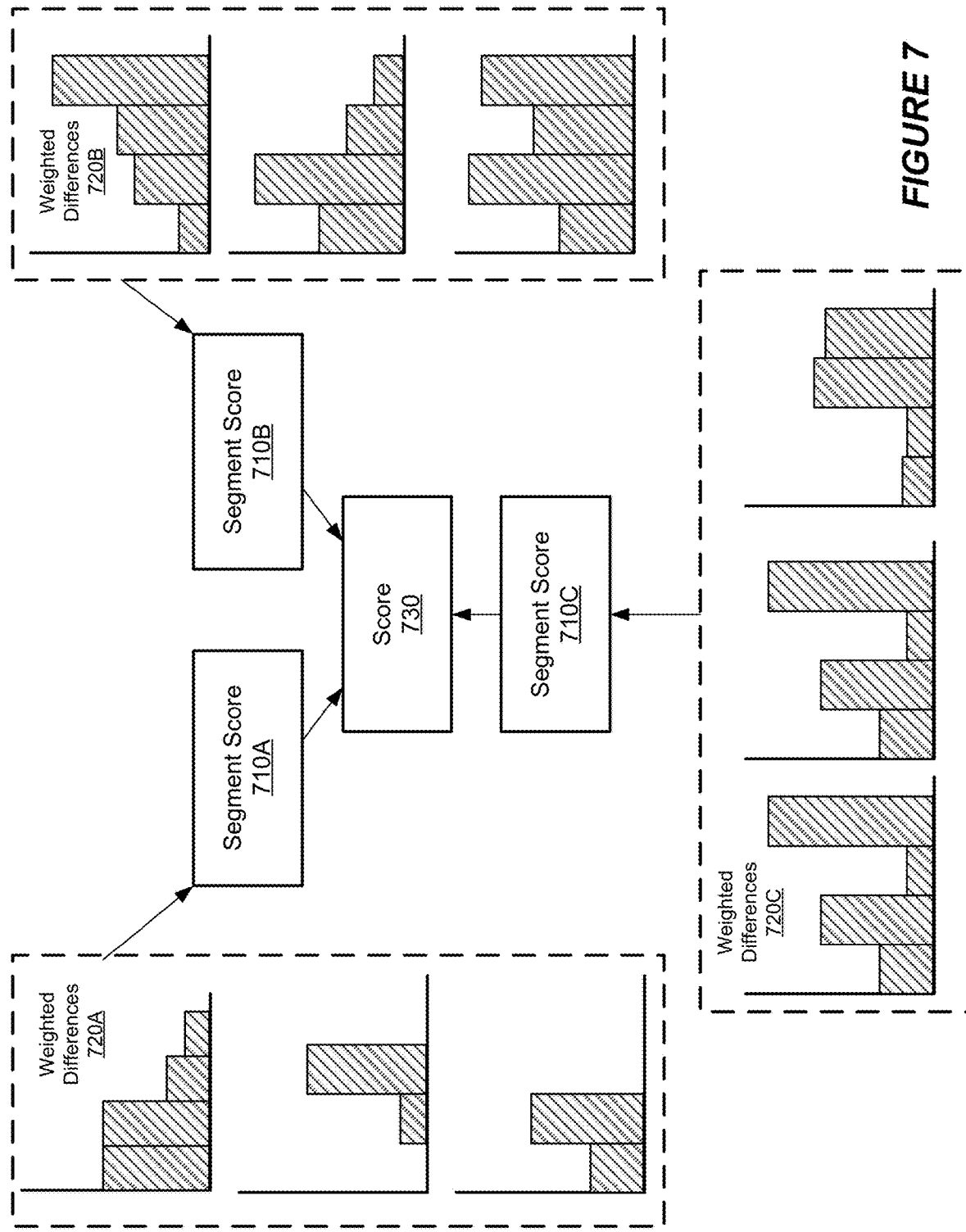
FIG. 7 illustrates an example scoring of driving metrics.

FIG. 7 illustrates an example scoring of driving metrics for a route. In particular embodiments, a score for evaluating a particular driving algorithm for a number of segments may be calculated. As described in more detail above, a set of weighted differences 720A-720C of the driving metrics representing the driving characteristics of the vehicles having a driving control system and the driving metrics representing desired driving characteristics may be determined for a number of segments. As illustrated in the example of FIG. 7, a score 710A-710C for each segment may be calculated using coefficients applied to one or more driving characteristics and weighted differences 720A-720C. The values of the coefficients may weigh particular driving characteristics (e.g., average velocity) more than others (e.g., distance to the center of a lane). As an example and not by way of limitation, each segment score 710A-710C may be represented as a linear equation and calculated as a sum of the weighted products for each driving characteristic and its respective coefficient. As illustrated in the example of FIG. 7, a score 730 for a route may be calculated using scores 710A-710C of the individual segments that form the route. As an example and not by way of limitation, score 730 of the route may be a sum of scores 710A-710C of the segments, an average of scores 710A-710C of the segments, weighted sum, weighted average, or any suitable operation.

In particular embodiments, score 730 of a route may be used to evaluate a particular version of a driving control system for a route may be calculated. Score 730 of a route or score 720A-720C of individual segments may be calculated in real-time as soon as the route or segment is completed. In particular embodiments, during operation, score 730 may be calculated after a segment is completed to evaluate the performance for that segment in relation to known and aggregated behavior on that segment. As an example and not by way of limitation, the score for a number of segments may be above a pre-determined threshold value indicating the driving algorithm has achieved reasonable matching to a human driver navigating the same route, but a particular segment of the route may have score 730 that is below the pre-determined threshold value. The score below the threshold value may indicate especially poor matching of the driving metrics for one or more driving characteristics by the driving control system for the particular segment. In this case, this poor matching may indicate especially suboptimal performance by the driving control system and the vehicle may be flagged for servicing or pulled off the road.

In particular embodiments, different versions of the driving control system (e.g., an updated or different version of a prediction software module, the implementation of a new model of a sensor with the existing autonomous software stack, any combination of software and/or hardware updates, etc.) may be used for each segment of a route and the relative performance of each driving algorithm may be evaluated and compared based on their relative scores. As an example and not by way of limitation, a number of versions of a driving control system may be ranked based on their score for one or more segments navigating one or more segments. In particular embodiments, score 730 or ranking may be used to identify particular versions of the driving control system that results in the best operation of the vehicle for a particular route or segment. As an example and not by way of limitation, a direct comparison based on score 730 may be made between two particular versions of particular LiDAR sensor tested on a route. As another example, different versions of a prediction software module may be compared based on a ranking for a particular segment. In particular embodiments, different versions of different modules that are better at performing on a particular route or segment may be used or updated based on the performance evaluation. As an example and not by way of limitation, a particular model of a LiDAR sensor may be used for vehicles having a driving control system that operates on a particular route. When a planning module selects a route that includes these segments, the vehicle may use the highest-ranked version of the planning software for those particular segments. In this way, the elegance of the travel along these segments may be optimized.

Especially poor performance by a particular vehicle or version of a driving control system may be identified based on score 730 relative to score 730 for other vehicles or versions of a driving control system. The score may be used to identify issues with a planning module used by the driving control systems and identify particular maneuvers, road segments, and/or scenarios that are problematic for particular versions of the driving control system. As an example and not by way of limitation, one or more segments of underperformance by the vehicles having a driving control system may be identified based on segment score 710A-710B of the identified route segments being below a pre-determined threshold value. In particular embodiments, adjustments may be made to the driving algorithm for segments with relatively low scores or scores below the pre-determined threshold value. As such, the results may help identify particular road conditions, obstacles, or scenarios that are difficult for the driving control system and allow for targeted development and training to fix the associated errors and problems with that particular road segment. In particular embodiments, adjustments to a particular version of a driving control system (e.g., software modules, hardware modules, or a combination of both) may be made to minimize weighted differences 710A-710C between the histograms of the vehicles having a driving control system and the histograms of the manually controlled vehicles. The adjusted version of the driving control system may be provided to one or more vehicles having a driving control system.

Figure 8:
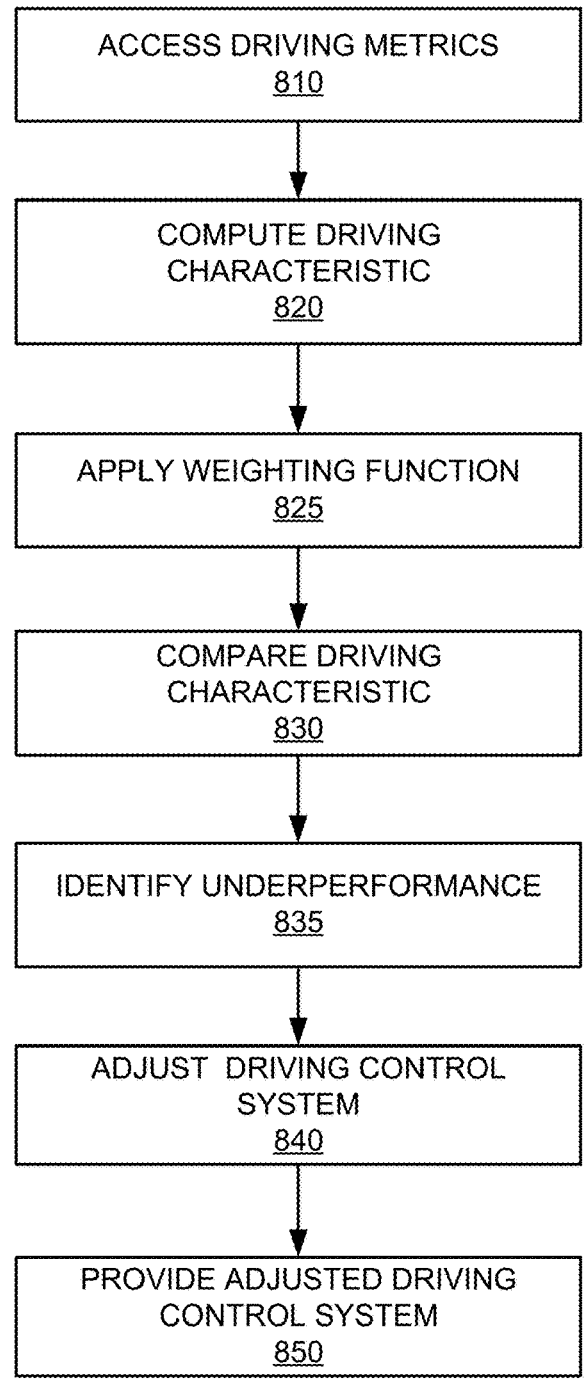
FIG. 8 illustrates an example method for adjusting a driving control system of a vehicle.

FIG. 8 illustrates an example method for adjusting a driving control system of a vehicle. The method 800 may begin at step 810, a computing system may access driving metrics of a vehicle using a driving control system to navigate a route. At step 820, the computing system may compute, based on the driving metrics, a driving characteristic for the vehicle having a driving control system. In particular embodiments, the driving characteristic is represented by the driving metrics. In particular embodiments, at step 825, the computing system may apply a weighting function to the respective driving metrics. As an example and not by way of limitation, the weighting function may be based on evaluations of passengers of vehicles driving the route. At step 830, the computing system may compare the driving characteristic of the vehicle having a driving control system to a driving characteristic of a manually controlled vehicle represented by the number of driving metrics. In particular embodiments, the driving metrics of the manually controlled vehicles are collected from a large number of manually controlled vehicles and used in the comparison to minimize noise or outlier data for any particular scenario.

In particular embodiments, at step 835, the computing system may identify if there exist one or more segments of the route where a particular version of the driving control system has underperformed. In particular embodiments, segments of underperformance may be identified based on the score of the routes having a score below a threshold value. In particular embodiments, the computing system may rank the current version of the driving control system with previous versions of the driving control system. In addition, the score may be used to identify particularly difficult segments or scenarios or problematic aspects of providing an elegant experience for a planning module. In particular embodiments, versions of the driving control system may be evaluated based on different goals (e.g., elegance, efficiency, or comfort) that are calculated using different scoring algorithms and measured over different conditions (e.g., over routes, particular scenarios, particular types of obstacles or maneuvers, etc.). At step 840, the computing system may modify the driving control system based on the comparison, described in step 830. In particular embodiments, the modifications may be based on the difference between the driving metrics of the vehicle having a driving control system and the driving metrics of the desired driving characteristics. At step 850, the computing system may provide the modifications to the driving control system to the vehicle.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for adjusting a driving control system of a vehicle including the particular steps of the method of FIG. 8, this disclosure contemplates any suitable method for adjusting a driving control system of a vehicle including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9C:
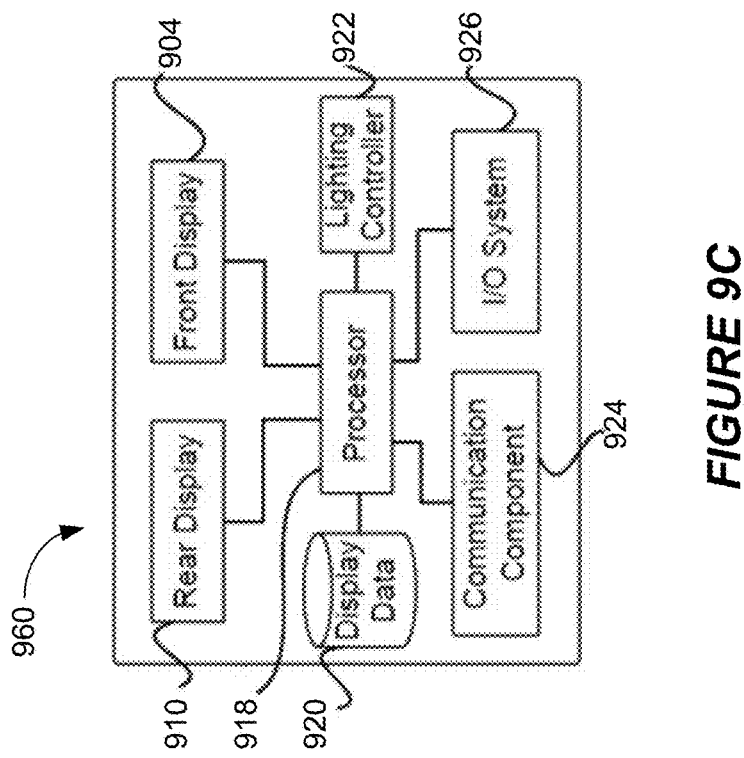
FIGS. 9A-9C illustrate an example of a transportation management vehicle device.
Figure 9A:
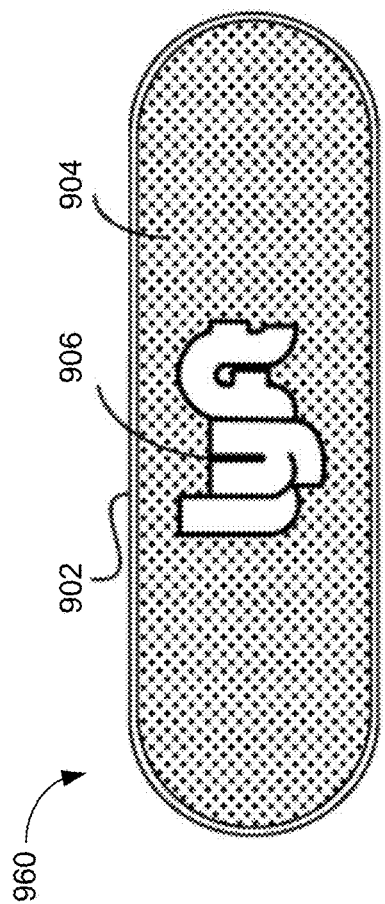
Figure 9B:
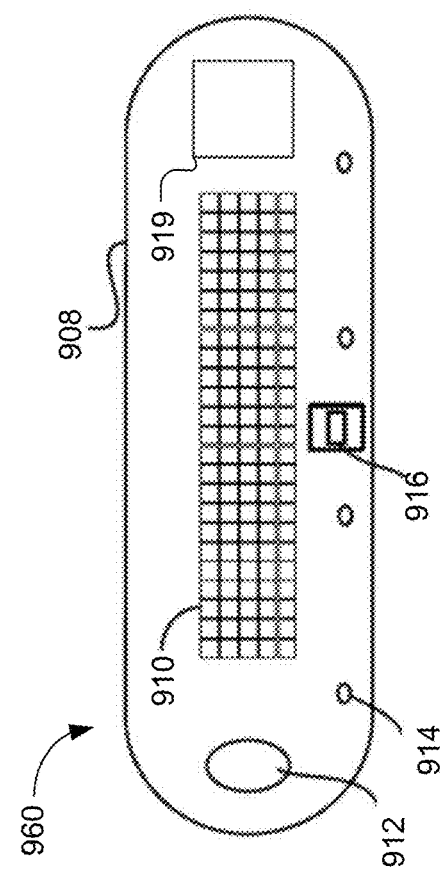

FIGS. 9A-9C show an example transportation management vehicle device 960 in accordance with embodiments described herein. The transportation management vehicle device 960 may include a front view 902 (FIG. 9A) and a rear view 908 (FIG. 9B). In particular embodiments, the front view 902 may be designed to face the outside of the vehicle so that it is visible to, e.g., ride requestors, and the rear view 908 may be designed to face the interior of the vehicle so that it is visible to, e.g., the passengers. As shown in FIG. 9A, a front view 902 of the transportation management vehicle device 960 may include a front display 904. In particular embodiments, the front display 904 may include a secondary region or separate display 906. As shown in FIG. 9A, the front display 904 may include various display technologies including, but not limited to, one or more liquid crystal displays (LCDs), one or more arrays of light emitting diodes (LEDs), AMOLED, or other display technologies. In particular embodiments, the front display 904 may include a cover that divides the display into multiple regions. In particular embodiments, separate displays may be associated with each region. In particular embodiments, the front display 904 may be configured to show colors, text, animation, patterns, color patterns, or any other suitable identifying information to requestors and other users external to a provider vehicle (e.g., at a popular pick-up location, requestors may quickly identify their respective rides and disregard the rest based on the identifying information shown). In particular embodiments, the secondary region or separate display 906 may be configured to display the same, or contrasting, information as front display 904.

FIG. 9B shows an embodiment of the rear view 908 of the transportation management vehicle device 960. As shown, the rear view 908 in particular embodiments may include a rear display 910. As with the front display 904, the rear display 910 may include various display technologies including, but not limited to, one or more liquid crystal displays (LCDs), one or more arrays of light emitting diodes (LEDs), AMOLED, or other display technologies. The rear display 980 may be configured to display information to the provider, the requestor, or other passengers in the passenger compartment of the vehicle. In particular embodiments, rear display 910 may be configured to provide information to people who are external to and behind the provider vehicle. Information may be conveyed via, e.g., scrolling text, color, patterns, animation, and any other visual display. As further shown in FIG. 9B, the transportation management vehicle device 960 may include a power button 912 or any other suitable user interface that can be used to turn the device 960 on or off. In particular embodiments, power button 912 may be a hardware button or switch that physically controls whether power is provided to the transportation management vehicle device 960. Alternatively, power button 912 may be a soft button that initiates a startup/shutdown procedure managed by software and/or firmware instructions. In particular embodiments, the transportation management vehicle device 960 may not include a power button 912. Additionally, the transportation management vehicle device 960 may include one or more light features 914 (such as one or more LEDs or other light sources) configured to illuminate areas adjacent to the device 960 and/or provide status signals.

In particular embodiments, the transportation management vehicle device 960 may include a connector 916. In particular embodiments, the connector 916 may be configured to physically connect to the ride provider's computing device and/or the requestor's computing device. In particular embodiments, the connector 916 may be configured for physically connecting the transportation management vehicle device 960 to the vehicle for power and/or for communicating with the vehicle. In one instance, the connector 916 may implement the CAN (Controller Area Network) bus interface or any other suitable communication interface or protocol for communicating with a vehicle. In another instance, the connector 916 may include a CAN bus interface that may be utilized in communicating with a vehicle. For example, the CAN bus interface may interface with an on-board diagnostics (OBD) port (e.g., an OBD-I port, an OBD-II port, etc.) of the vehicle. In particular embodiments, through the connector 916, the transportation management vehicle device 960 may be able to issue instructions to the vehicle's onboard computer and cause it to adjust certain vehicle configurations, such as air-conditioning level, entertainment/informational content (e.g., music, news station, content source, etc.), audio volume, window configuration, seat warmer temperature, and any other configurable features of the vehicle. As another example, the connector 916 may enable the transportation management vehicle device 960 to query the vehicle for certain data, such as current configurations of any of the aforementioned features, as well as the vehicle's speed, fuel level, tire pressure, external temperature gauge, navigation system, and any other information available through the vehicle's computing system. In particular embodiments, the transportation management vehicle device 960 may be further configured with wireless communication capabilities (e.g., Bluetooth, WI-FI, NFC, etc.), thereby enabling the device 960 to wirelessly communicate with the vehicle, the provider's computing device, and/or the requestor's computing device.

In particular embodiments, the transportation management vehicle device 960 may be integrated with one or more sensors 919, such as a camera, microphone, infrared sensor, gyroscope, accelerometer, and any other suitable sensor for detecting signals of interest within the passenger compartment of the vehicle. For example, the sensor 919 may be a rear-facing wide-angle camera that captures the passenger compartment and any passengers therein. As another example, the sensor 919 may be a microphone that captures conversation and/or sounds in the passenger compartment. The sensor 919 may also be an infrared sensor capable of detecting motion and/or temperature of the passengers.

Although FIG. 9B illustrates particular numbers of components (e.g., a single sensor 919, a single display 910, a single connector 916, etc.), one of ordinary skill in the art would appreciate that any suitable number of each type of component may be included in the transportation management vehicle device 960. For example, in particular embodiments, a transportation management vehicle device 960 may include one or more of a camera, microphone, and infrared sensor. As another example, the device 960 may include one or more communication interfaces, whether wired or wireless.

FIG. 9C shows a block diagram of various components of a transportation management vehicle device 960 in accordance with particular embodiments. As shown in FIG. 9C, the transportation management vehicle device 960 may include a processor 918. Processor 918 may control information displayed on rear display 910 and front display 904. As described herein, each display may be designed to display information to different intended users, depending on the positioning of the users and the transportation management vehicle device 960. In particular embodiments, display data 920 may include stored display patterns, sequences, colors, text, animation or other data to be displayed on the front and/or rear display. The display data 920 may also include algorithms for generating content and controlling how it is displayed. The generated content, for example, may be personalized based on information received from the transportation management system, any third-party system, the vehicle, and the computing devices of the provider and/or requestor. In particular embodiments, display data 920 may be stored on a hard disk drive, solid-state drive, memory, or any other storage device.

In particular embodiments, lighting controller 922 may manage the colors and/or other lighting displayed by light features 914, the front display 904, and/or the back display 910. The lighting controller may include rules and algorithms for controlling the lighting features 914 so that the intended information is conveyed. For example, to help a set of matching provider and requestor find each other at a pick-up location, the lighting controller 922 may obtain instructions that the color blue is to be used for identification. In response, the front display 904 may display blue and the lighting controller 922 may cause the light features 914 to display blue so that the ride provider would know what color to look for.

In particular embodiments, the transportation management vehicle device 960 may include a communication component 924 for managing communications with other systems, including, e.g., the provider device, the requestor device, the vehicle, the transportation management system, and third-party systems (e.g., music, entertainment, traffic, and/or maps providers). In particular embodiments, communication component 924 may be configured to communicate over WI-FI, Bluetooth, NFC, RF, or any other wired or wireless communication network or protocol.

In particular embodiments, ride-service device 960 may include an input/output system 926 configured to receive inputs from users and/or the environment and provide output. For example, I/O system 926 may include a sensor such as an image-capturing device configured to recognize motion or gesture-based inputs from passengers, a microphone configured to detect and record speech or dialog uttered, a heat sensor to detect the temperature in the passenger compartment, and any other suitable sensor. The I/O system 926 may output the detected sensor data to any other system, including the transportation management system, the computing devices of the ride provider and requestor, etc. Additionally, I/O system 926 may include an audio device configured to provide audio outputs (such as alerts, instructions, or other information) to users and/or receive audio inputs, such as audio commands, which may be interpreted by a voice recognition system or any other command interface. In particular embodiments, I/O system 926 may include one or more input or output ports, such as USB (universal serial bus) ports, lightning connector ports, or other ports enabling users to directly connect their devices to the transportation management vehicle device 960 (e.g., to exchange data, verify identity information, provide power, etc.).

Figure 10:
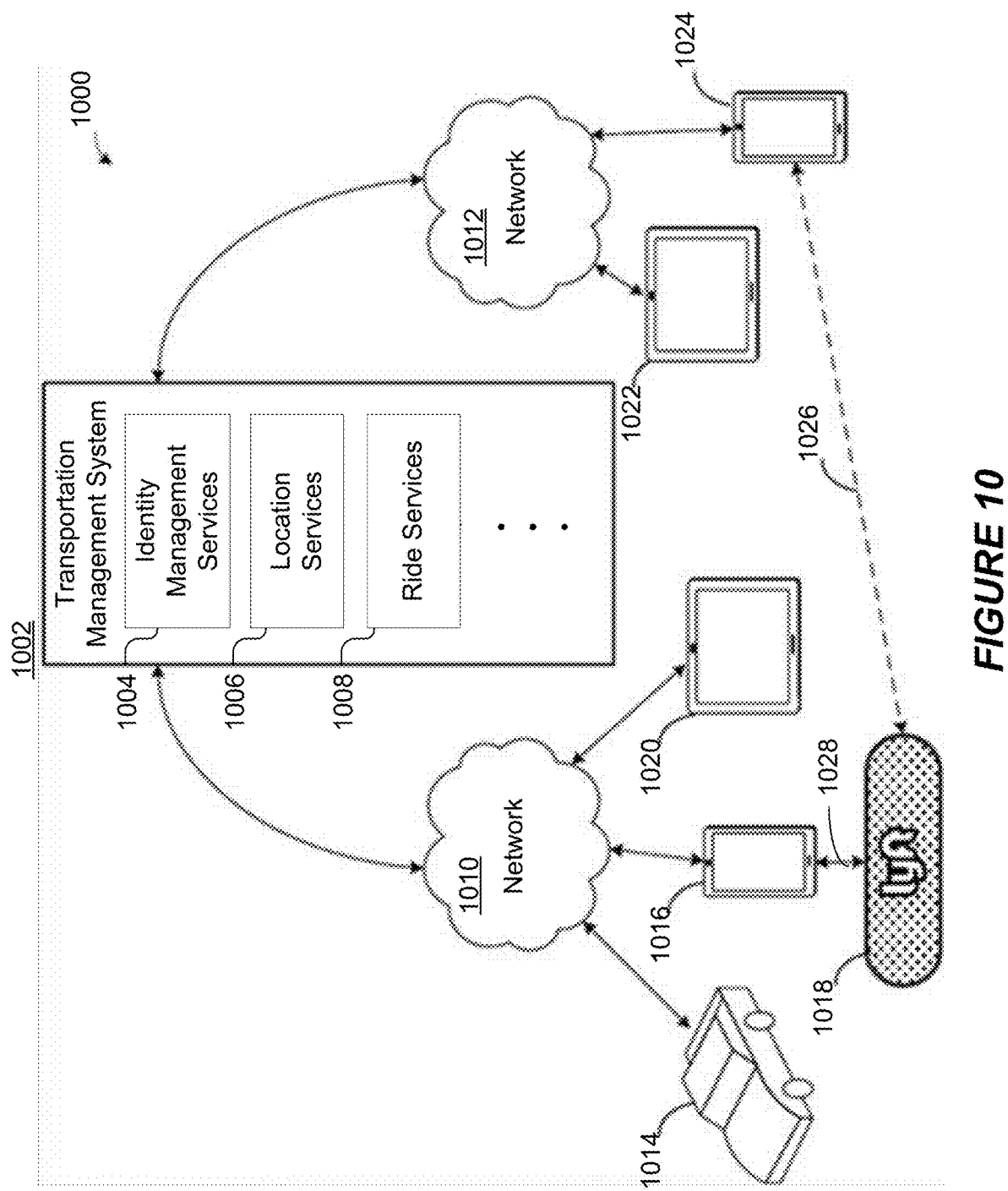
FIG. 10 illustrates an example block diagram of a transportation management environment.

FIG. 10 shows a transportation management environment 1000, in accordance with particular embodiments. For example, a transportation management system 1002 executing on one or more servers or distributed systems may be configured to provide various services to ride requestors and providers. In particular embodiments, the transportation management system 1002 may include software modules or applications, including, e.g., identity management services 1004, location services 1006, ride services 1008, and/or any other suitable services. Although a particular number of services are shown as being provided by system 1002, more or fewer services may be provided in various embodiments. In addition, although these services are shown as being provided by the system 1002, all or a portion of any of the services may be processed in a distributed fashion. For example, computations associated with a service task may be performed by a combination of the transportation management system 1002 (including any number of servers, databases, etc.), one or more devices associated with the provider (e.g., devices integrated with the managed vehicles 1014, provider's computing devices 1016 and tablets 1020, and transportation management vehicle devices 1018), and/or one or more devices associated with the ride requestor (e.g., the requestor's computing devices 1024 and tablets 1022). In particular embodiments, the transportation management system 1002 may include one or more general purpose computers, server computers, distributed computing systems, clustered computing systems, cloud-based computing systems, or any other computing systems or arrangements of computing systems. The transportation management system 1002 may be configured to run any or all of the services and/or software applications described herein. In particular embodiments, the transportation management system 1002 may include an appropriate operating system as well as various server applications, such as web servers capable of handling hypertext transport protocol (HTTP) requests, file transfer protocol (FTP) servers, database servers, etc.

In particular embodiments, identity management services 1004 may be configured to, e.g., perform authorization services for requestors and providers and manage their interactions and data with the transportation management system 1002. This may include, e.g., authenticating the identity of providers and determining that they are authorized to provide services through the transportation management system 1002. Similarly, requestors' identities may be authenticated to determine whether they are authorized to receive the requested services through the transportation management system 1002. Identity management services 1004 may also manage and control access to provider and requestor data maintained by the transportation management system 1002, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 1004 may also manage and control access to provider/requestor data stored with and/or obtained from third-party systems. For example, a requester or provider may grant the transportation management system 1002 access to a third-party email, calendar, or task management system (e.g., via the user's credentials). As another example, a requestor or provider may grant, through a mobile device (e.g., 1016, 1020, 1022, and 1024), a transportation application associated with the transportation management system 1002 access to data provided by other applications installed on the mobile device. Such data may be processed on the client and/or uploaded to the transportation management system 1002 for processing, if so desired.

In particular embodiments, the transportation management system 1002 may provide location services 1006, which may include navigation and/or traffic management services and user interfaces. For example, the location services 1006 may be responsible for querying devices associated with the provider (e.g., vehicle 1014, computing device 1016, tablet 1020, transportation management vehicle device 1018) and the requester (e.g., computing device 1024 and tablet 1022) for their locations. The location services 1006 may also be configured to track those devices to determine their relative proximities, generate relevant alerts (e.g., proximity is within a threshold distance), generate navigation recommendations, and any other location-based services.

In particular embodiments, the transportation management system 1002 may provide ride services 1008, which may include ride matching and management services to connect a requestor to a provider. For example, after the identity of a ride requestor has been authenticated by the identity management services module 1004, the ride services module 1008 may attempt to match the requestor with one or more ride providers. In particular embodiments, the ride services module 1008 may identify an appropriate provider using location data obtained from the location services module 1006. The ride services module 1008 may use the location data to identify providers who are geographically close to the requestor (e.g., within a certain threshold distance or travel time) and further identify those who are a good match with the requestor. The ride services module 1008 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 1008 may use rule-based algorithms or machine-learning models for matching requestors and providers.

The transportation management system 1002 may communicatively connect to various devices through networks 1010 and 1012. Networks 1010, 1012 may include any combination of interconnected networks configured to send and/or receive data communications using various communication protocols and transmission technologies. In particular embodiments, networks 1010, 1012 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 1010, 1012 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 1010, 1012 may each include any combination of networks described herein or known to one of ordinary skill in the art.

In particular embodiments, devices within a vehicle may be interconnected. For example, any combination of the following may be communicatively connected: vehicle 1014, provider computing device 1016, provider tablet 1020, transportation management vehicle device 1018, requestor computing device 1024, requestor tablet 1022, and any other device (e.g., smart watch, smart tags, etc.). For example, the transportation management vehicle device 1018 may be communicatively connected to the provider computing device 1016 and/or the requestor computing device 1024. The transportation management vehicle device 1018 may connect 1026, 1028 to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 1002 using applications executing on their respective computing devices (e.g., 1014, 1016, 1018, and/or 1020), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In particular embodiments, provider computing device 1014 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based, or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 1002. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 11:
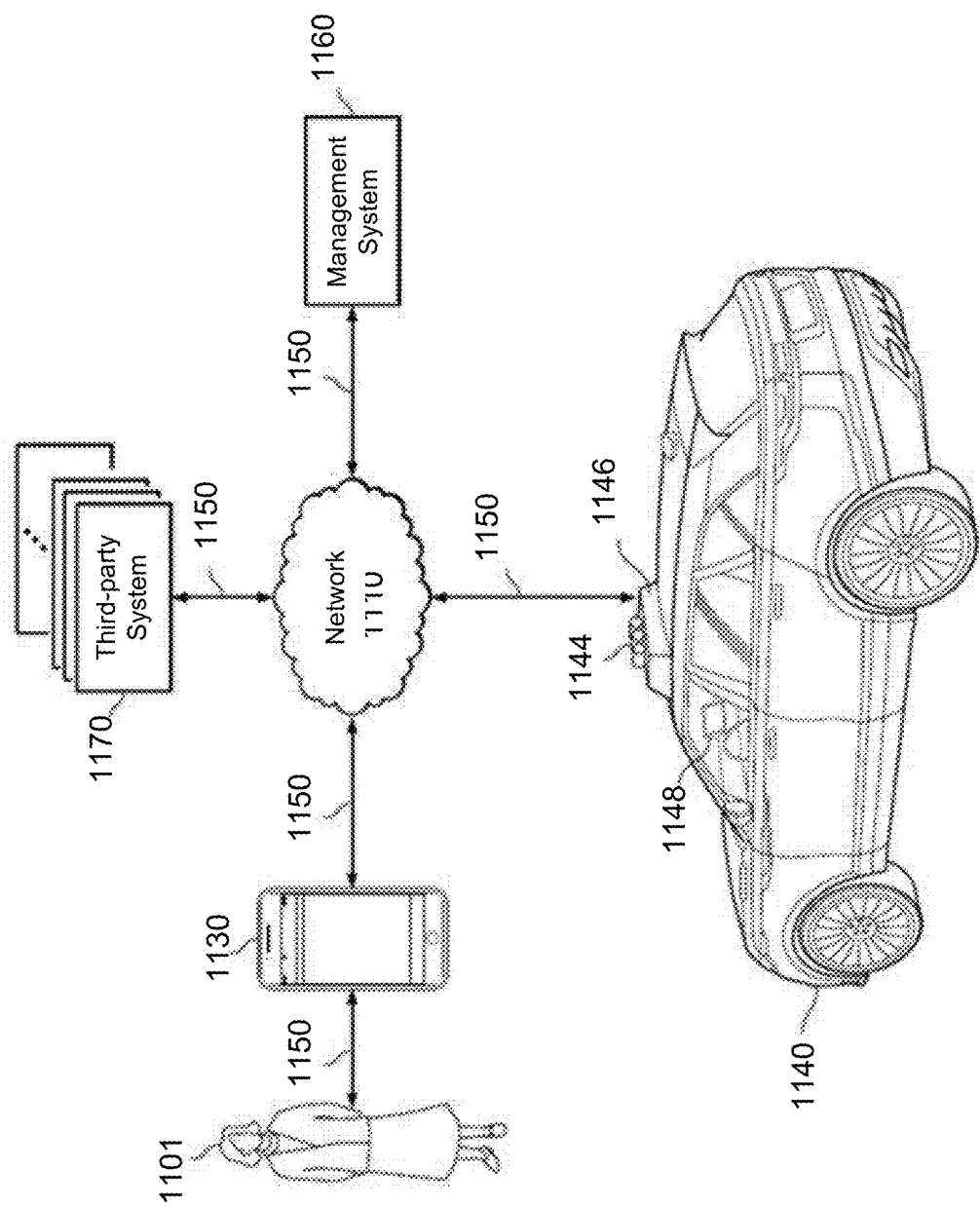
FIG. 11 illustrates an example block diagram of a transportation management environment for matching ride requestors with autonomous vehicles.

FIG. 11 illustrates an example block diagram of a transportation management environment for matching ride requestors with autonomous vehicles. In particular embodiments, the environment may include various computing entities, such as a user computing device 1130 of a user 1101 (e.g., a ride provider or requestor), a transportation management system 1160, an autonomous vehicle 1140, and one or more third-party system 1170. The computing entities may be communicatively connected over any suitable network 1110. As an example and not by way of limitation, one or more portions of network 1110 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 11 illustrates a single user device 1130, a single transportation management system 1160, a single vehicle 1140, a plurality of third-party systems 1170, and a single network 1110, this disclosure contemplates any suitable number of each of these entities. As an example and not by way of limitation, the network environment may include multiple users 1101, user devices 1130, transportation management systems 1160, autonomous-vehicles 1140, third-party systems 1170, and networks 1110.

The user device 1130, transportation management system 1160, autonomous vehicle 1140, and third-party system 1170 may be communicatively connected or co-located with each other in whole or in part. These computing entities may communicate via different transmission technologies and network types. For example, the user device 1130 and the vehicle 1140 may communicate with each other via a cable or short-range wireless communication (e.g., Bluetooth, NFC, WI-FI, etc.), and together they may be connected to the Internet via a cellular network that is accessible to either one of the devices (e.g., the user device 1130 may be a smartphone with LTE connection). The transportation management system 1160 and third-party system 1170, on the other hand, may be connected to the Internet via their respective LAN/WLAN networks and Internet Service Providers (ISP). FIG. 11 illustrates transmission links 1150 that connect user device 1130, autonomous vehicle 1140, transportation management system 1160, and third-party system 1170 to communication network 1110. This disclosure contemplates any suitable transmission links 1150, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1150 may connect to one or more networks 1110, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1150. For example, the user device 1130 may communicate with the transportation management system via a cellular network and the Internet, but communicate with the autonomous vehicle 1140 via Bluetooth or a physical wire connection.

In particular embodiments, the transportation management system 1160 may fulfill ride requests for one or more users 1101 by dispatching suitable vehicles. The transportation management system 1160 may receive any number of ride requests from any number of ride requestors 1101. In particular embodiments, a ride request from a ride requestor 1101 may include an identifier that identifies the ride requestor in the system 1160. The transportation management system 1160 may use the identifier to access and store the ride requestor's 1101 information, in accordance with the requestor's 1101 privacy settings. The ride requestor's 1101 information may be stored in one or more data stores (e.g., a relational database system) associated with and accessible to the transportation management system 1160. In particular embodiments, ride requestor information may include profile information about a particular ride requestor 1101. In particular embodiments, the ride requestor 1101 may be associated with one or more categories or types, through which the ride requestor 1101 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1160 may classify a user 1101 based on known information about the user 1101 (e.g., using machine-learning classifiers), and use the classification to retrieve relevant aggregate information associated with that class. For example, the system 1160 may classify a user 1101 as a young adult and retrieve relevant aggregate information associated with young adults, such as the type of music generally preferred by young adults.

Transportation management system 1160 may also store and access ride information. Ride information may include locations related to the ride, traffic data, route options, optimal pick-up or drop-off locations for the ride, or any other suitable information associated with a ride. As an example and not by way of limitation, when the transportation management system 1160 receives a request to travel from San Francisco International Airport (SFO) to Palo Alto, Calif., the system 1160 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason;

one or more routes to navigate from SFO to Palo Alto; preferred off-ramps for a type of user; or any other suitable information associated with the ride. In particular embodiments, portions of the ride information may be based on historical data associated with historical rides facilitated by the system 1160. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1160. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1160 in particular embodiments may predict and provide ride suggestions in response to a ride request. In particular embodiments, the system 1160 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1160 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1160 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1130 (which may belong to a ride requestor or provider), a transportation management system 1160, vehicle system 1140, or a third-party system 1170 to process, transform, manage, retrieve, modify, add, or delete the information stored in the data store.

In particular embodiments, transportation management system 1160 may include an authorization server (or any other suitable component(s)) that allows users 1101 to opt-in to or opt-out of having their information and actions logged, recorded, or sensed by transportation management system 1160 or shared with other systems (e.g., third-party systems 1170). In particular embodiments, a user 1101 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1101 of transportation management system 1160 through blocking, data hashing, anonymization, or other suitable techniques as appropriate.

In particular embodiments, third-party system 1170 may be a network-addressable computing system that may provide HD maps or host GPS maps, customer reviews, music or content, weather information, or any other suitable type of information. Third-party system 1170 may generate, store, receive, and send relevant data, such as, for example, map data, customer review data from a customer review website, weather data, or any other suitable type of data. Third-party system 1170 may be accessed by the other computing entities of the network environment either directly or via network 1110. For example, user device 1130 may access the third-party system 1170 via network 1110, or via transportation management system 1160. In the latter case, if credentials are required to access the third-party system 1170, the user 1101 may provide such information to the transportation management system 1160, which may serve as a proxy for accessing content from the third-party system 1170.

In particular embodiments, user device 1130 may be a mobile computing device such as a smartphone, tablet computer, or laptop computer. User device 1130 may include one or more processors (e.g., CPU and/or GPU), memory, and storage. An operating system and applications may be installed on the user device 1130, such as, e.g., a transportation application associated with the transportation management system 1160, applications associated with third-party systems 1170, and applications associated with the operating system. User device 1130 may include functionality for determining its location, direction, or orientation, based on integrated sensors such as GPS, compass, gyroscope, or accelerometer. User device 1130 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1130 may also include one or more cameras, scanners, touchscreens, microphones, speakers, and any other suitable input-output devices.

In particular embodiments, the vehicle 1140 may be an autonomous vehicle and equipped with an array of sensors 1144, a navigation system 1146, and a ride-service computing device 1148. In particular embodiments, a fleet of autonomous vehicles 1140 may be managed by the transportation management system 1160. The fleet of autonomous vehicles 1140, in whole or in part, may be owned by the entity associated with the transportation management system 1160, or they may be owned by a third-party entity relative to the transportation management system 1160. In either case, the transportation management system 1160 may control the operations of the autonomous vehicles 1140, including, e.g., dispatching select vehicles 1140 to fulfill ride requests, instructing the vehicles 1140 to perform select operations (e.g., head to a service center or charging/fueling station, pull over, stop immediately, self-diagnose, lock/unlock compartments, change music station, change temperature, and any other suitable operations), and instructing the vehicles 1140 to enter select operation modes (e.g., operate normally, drive at a reduced speed, drive under the command of human operators, and any other suitable operational modes).

In particular embodiments, the autonomous vehicles 1140 may receive data from and transmit data to the transportation management system 1160 and the third-party system 1170. Example of received data may include, e.g., instructions, new software or software updates, maps, 3D models, trained or untrained machine-learning models, location information (e.g., location of the ride requestor, the autonomous vehicle 1140 itself, other autonomous vehicles 1140, and target destinations such as service centers), navigation information, traffic information, weather information, entertainment content (e.g., music, video, and news) ride requestor information, ride information, and any other suitable information. Examples of data transmitted from the autonomous vehicle 1140 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1140, passengers may send/receive data to the transportation management system 1160 and/or third-party system 1170), and any other suitable data.

In particular embodiments, autonomous vehicles 1140 may also communicate with each other as well as other traditional human-driven vehicles, including those managed and not managed by the transportation management system 1160. For example, one vehicle 1140 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1160 or third-party system 1170).

In particular embodiments, an autonomous vehicle 1140 may obtain and process sensor/telemetry data. Such data may be captured by any suitable sensors. For example, the vehicle 1140 may have aa Light Detection and Ranging (LiDAR) sensor array of multiple LiDAR transceivers that are configured to rotate 360°, emitting pulsed laser light and measuring the reflected light from objects surrounding vehicle 1140. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 1140. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 1140 may have optical cameras pointing in different directions. The cameras may be used for, e.g., recognizing roads, lane markings, street signs, traffic lights, police, other vehicles, and any other visible objects of interest. To enable the vehicle 1140 to "see" at night, infrared cameras may be installed. In particular embodiments, the vehicle may be equipped with stereo vision for, e.g., spotting hazards such as pedestrians or tree branches on the road. As another example, the vehicle 1140 may have radars for, e.g., detecting other vehicles and/or hazards afar. Furthermore, the vehicle 1140 may have ultrasound equipment for, e.g., parking and obstacle detection. In addition to sensors enabling the vehicle 1140 to detect, measure, and understand the external world around it, the vehicle 1140 may further be equipped with sensors for detecting and self-diagnosing the vehicle's own state and condition. For example, the vehicle 1140 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1140 may build a 3D model of its surrounding based on data from its LiDAR, radar, sonar, and cameras, along with a pre-generated map obtained from the transportation management system 1160 or the third-party system 1170. Although sensors 1144 appear in a particular location on autonomous vehicle 1140 in FIG. 11, sensors 1144 may be located in any suitable location in or on autonomous vehicle 1140. Example locations for sensors include the front and rear bumpers, the doors, the front windshield, on the side panel, or any other suitable location.

In particular embodiments, the autonomous vehicle 1140 may be equipped with a processing unit (e.g., one or more CPUs and GPUs), memory, and storage. The vehicle 1140 may thus be equipped to perform a variety of computational and processing tasks, including processing the sensor data, extracting useful information, and operating accordingly. For example, based on images captured by its cameras and a machine-vision model, the vehicle 1140 may identify particular types of objects captured by the images, such as pedestrians, other vehicles, lanes, curbs, and any other objects of interest.

In particular embodiments, the autonomous vehicle 1140 may have a navigation system 1146 responsible for safely navigating the autonomous vehicle 1140. In particular embodiments, the navigation system 1146 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1146 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1146 may use its determinations to control the vehicle 1140 to operate in prescribed manners and to guide the autonomous vehicle 1140 to its destinations without colliding into other objects. Although the physical embodiment of the navigation system 1146 (e.g., the processing unit) appears in a particular location on autonomous vehicle 1140 in FIG. 11, navigation system 1146 may be located in any suitable location in or on autonomous vehicle 1140. Example locations for navigation system 1146 include inside the cabin or passenger compartment of autonomous vehicle 1140, near the engine/battery, near the front seats, rear seats, or in any other suitable location.

In particular embodiments, the autonomous vehicle 1140 may be equipped with a ride-service computing device 1148, which may be a tablet or any other suitable device installed by transportation management system 1160 to allow the user to interact with the autonomous vehicle 1140, transportation management system 1160, other users 1101, or third-party systems 1170. In particular embodiments, installation of ride-service computing device 1148 may be accomplished by placing the ride-service computing device 1148 inside autonomous vehicle 1140, and configuring it to communicate with the vehicle 1140 via a wire or wireless connection (e.g., via Bluetooth). Although FIG. 11 illustrates a single ride-service computing device 1148 at a particular location in autonomous vehicle 1140, autonomous vehicle 1140 may include several ride-service computing devices 1148 in several different locations within the vehicle. As an example and not by way of limitation, autonomous vehicle 1140 may include four ride-service computing devices 1148 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1148 may be detachable from any component of autonomous vehicle 1140. This may allow users to handle ride-service computing device 1148 in a manner consistent with other tablet computing devices. As an example and not by way of limitation, a user may move ride-service computing device 1148 to any location in the cabin or passenger compartment of autonomous vehicle 1140, may hold ride-service computing device 1148, or handle ride-service computing device 1148 in any other suitable manner. Although this disclosure describes providing a particular computing device in a particular manner, this disclosure contemplates providing any suitable computing device in any suitable manner.

Figure 12:
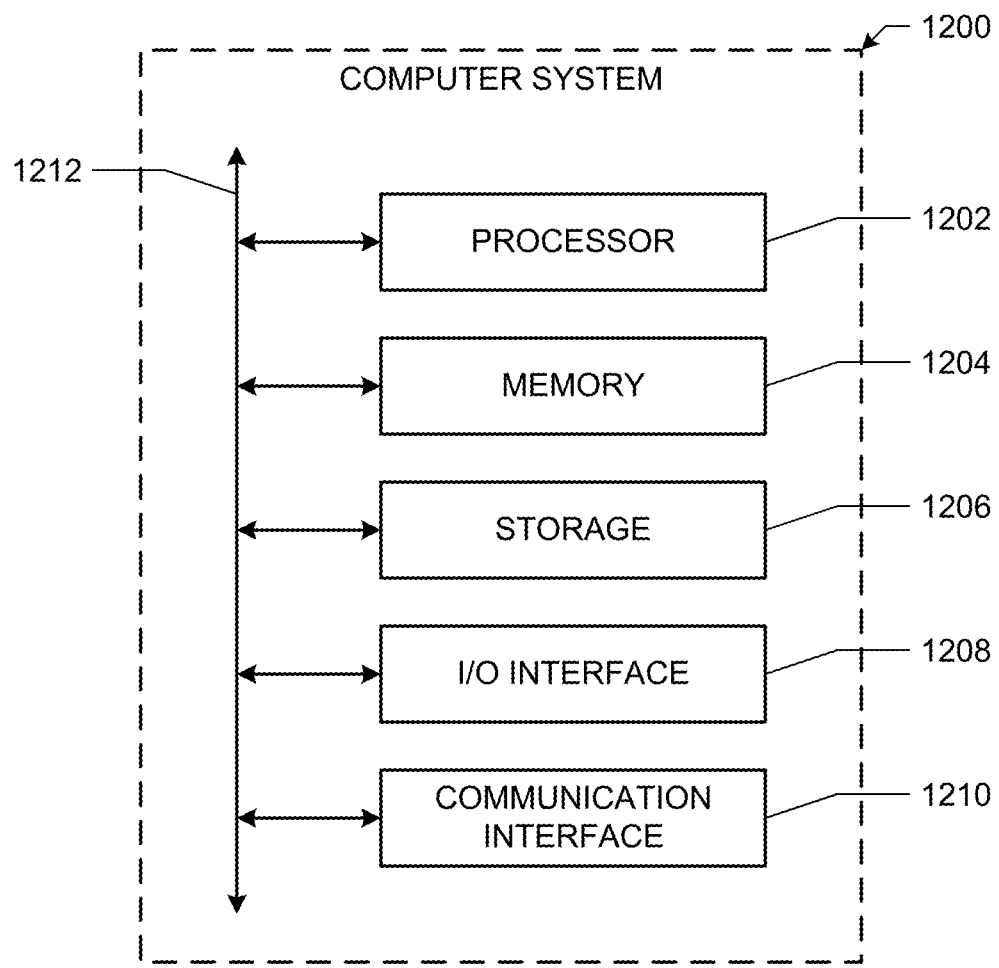
FIG. 12 illustrates an example of a computing system.

FIG. 12 illustrates an example computer system. In particular embodiments, one or more computer systems 1200 perform one or more steps of one or more methods described or illustrated herein. In particular embodiments, one or more computer systems 1200 provide the functionalities described or illustrated herein. In particular embodiments, software running on one or more computer systems 1200 performs one or more steps of one or more methods described or illustrated herein or provides the functionalities described or illustrated herein. Particular embodiments include one or more portions of one or more computer systems 1200. Herein, a reference to a computer system may encompass a computing device, and vice versa, where appropriate. Moreover, a reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real-time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 that are to be operated on by computer instructions; the results of previous instructions executed by processor 1202 that are accessible to subsequent instructions or for writing to memory 1204 or storage 1206; or any other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs), be a multi-core processor, or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described in further detail below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    determining a first plurality of driving metrics of at least one vehicle navigating a road segment using a first driving control system, wherein the first plurality of driving metrics include one or more measurements associated with movement of the at least one vehicle while navigating the road segment, and wherein the first driving control system controls the movement of the at least one vehicle while navigating the road segment;
    determining, based on the first plurality of driving metrics, a first driving characteristic for the first driving control system;
    comparing the first driving characteristic of the first driving control system to a second driving characteristic of a plurality of manually controlled vehicles represented by a second plurality of driving metrics collected while each of the plurality of manually controlled vehicles are navigating the road segment;
    computing a first score indicating an elegance of the first driving control system used in navigating the road segment based on the comparison of the first driving characteristic to the second driving characteristic;
    determining a second score indicating an elegance of at least one vehicle navigating the road segment using a second driving control system;
    evaluating the first driving control system relative to the second driving control system based on a comparison of the first score and the second score; and
    selecting, based on the evaluation, the second driving control system for a vehicle, wherein the selected second driving control system is provided to the vehicle and wherein the second driving control system controls the movement of the vehicle.

2. The method of claim 1, wherein comparing the first driving characteristic to the second driving characteristic comprises calculating one or more differences between the first plurality of driving metrics of the at least one vehicle and the second plurality of driving metrics of the plurality of manually controlled vehicles.

3. The method of claim 2, wherein computing the first score further comprises
    applying one or more weights to the one or more differences.

4. The method of claim 1, further comprising:
    computing a plurality of scores for a plurality of road segments, respectively, wherein each of the plurality of scores indicates an elegance of the first driving control system used in navigating the corresponding road segment associated with that score; and
    calculating a route score for a route based on the plurality of scores for the plurality of road segments, wherein the route comprises the plurality of road segments.

5. The method of claim 4, further comprising identifying one or more road segments in the plurality of road segments in which the first driving control system underperformed, wherein each of the identified one or more road segments is identified by comparing the associated score with a pre-determined threshold value.

6. The method of claim 5, further comprising identifying one or more scenarios of underperformance associated with the identified one or more road segments.

7. The method of claim 1, wherein the first plurality of driving metrics comprises one or more of an acceleration, a deceleration, a distance from a center of a driving lane, a distance from nearby objects, an amount of centripetal force, a steering angle, a change of acceleration, or an average speed over the segment.

8. The method of claim 1, wherein the elegance of the first driving control system indicates a level of driving similarity between the first driving control system and the plurality of manually controlled vehicles.

9. One or more computer-readable non-transitory storage media embodying software that is operable when executed to cause one or more processors to perform operations comprising:
  determine a first plurality of driving metrics of at least one vehicle navigating a road segment using a first driving control system, wherein the first plurality of driving metrics include one or more measurements associated with movement of the at least one vehicle while navigating the road segment, and wherein the first driving control system controls the movement of the at least one vehicle while navigating the road segment;
  determine, based on the first plurality of driving metrics, a first driving characteristic for the first driving control system;
  compare the first driving characteristic of the first driving control system to a second driving characteristic of a plurality of manually controlled vehicles represented by a second plurality of driving metrics collected while each of the plurality of manually controlled vehicles are navigating the road segment;
  compute a first score indicating an elegance of the first driving control system used in navigating the road segment based on the comparison of the first driving characteristic to the second driving characteristic;
  determine a second score indicating an elegance of at least one vehicle navigating the road segment using a second driving control system;
  evaluate the first driving control system relative to the second driving control system based on a comparison of the first score and the second score; and
  select, based on the evaluation, the second driving control system for a vehicle, wherein the selected second driving control system is provided to the vehicle and wherein the second driving control system controls the movement of the vehicle.

10. The media of claim 9, wherein the software is further operable when executed to calculate one or more differences between the first plurality of driving metrics of the at least one vehicle and the second plurality of driving metrics of the plurality of manually controlled vehicles.

11. The media of claim 10, wherein the software is further operable when executed to
  apply one or more weights to the one or more differences.

12. The media of claim 9, wherein the elegance of the first driving control system indicates a level of driving similarity between the first driving control system and the plurality of manually controlled vehicles.

13. The media of claim 9, wherein the software is further operable when executed to:
  compute a plurality of scores for a plurality of road segments, respectively, wherein each of the plurality of scores indicates an elegance of the first driving control system used in navigating the corresponding road segment associated with that score; and
  calculate a route score for a route based on the plurality of scores for the plurality of road segments, wherein the route comprises the plurality of road segments.

14. The media of claim 13, wherein the software is further operable when executed to identify one or more road segments in the plurality of road segments in which the first driving control system underperformed, wherein each of the identified one or more road segments is identified by comparing the associated score with a pre-determined threshold value.

15. A computing system comprising:
  one or more processors; and
  one or more computer-readable non-transitory storage media coupled to the one or more processors, the one or more computer-readable non-transitory storage media comprising instructions operable when executed by the one or more processors to cause the computing system to perform operations comprising:
    determine a first plurality of driving metrics of at least one vehicle navigating a road segment using a first driving control system, wherein the first plurality of driving metrics include one or more measurements associated with movement of the at least one vehicle while navigating the road segment, and wherein the first driving control system controls the movement of the at least one vehicle while navigating the road segment;
    determine, based on the first plurality of driving metrics, a first driving characteristic for the first driving control system;
    compare the first driving characteristic of the first driving control system to a second driving characteristic of a plurality of manually controlled vehicles represented by a second plurality of driving metrics collected while each of the plurality of manually controlled vehicles are navigating the road segment;
    compute a first score indicating an elegance of the first driving control system used in navigating the road segment based on the comparison of the first driving characteristic to the second driving characteristic;
    determine a second score indicating an elegance of at least one vehicle navigating the road segment using a second driving control system;
    evaluate the first driving control system relative to the second driving control system based on a comparison of the first score and the second score; and
    select, based on the evaluation, the second driving control system for a vehicle, wherein the selected second driving control system is provided to the vehicle and wherein the second driving control system controls the movement of the vehicle.

16. The system of claim 15, wherein the one or more processors are further operable to calculate one or more differences between the first plurality of driving metrics of the at least one vehicle and the second plurality of driving metrics of the plurality of manually controlled vehicles.

17. The system of claim 16, wherein the one or more processors are further operable to
  apply one or more weights to the one or more differences.

18. The system of claim 17, wherein the elegance of the first driving control system indicates a level of driving similarity between the first driving control system and the plurality of manually controlled vehicles.

19. The system of claim 15, wherein the one or more processors are further operable to:
  compute a plurality of scores for a plurality of road segments, respectively, wherein each of the plurality of scores indicates an elegance of the first driving control system used in navigating the corresponding road segment associated with that score; and
  calculate a route score for a route based on the plurality of scores for the plurality of road segments, wherein the route comprises the plurality of road segments.

20. The system of claim 19, wherein the one or more processors are further operable to identify one or more road segments in the plurality of road segments in which the first driving control system underperformed, wherein each of the identified one or more road segments is identified by comparing the associated score with a pre-determined threshold value.

* * * * *